(12) United States Patent
Chin et al.

(10) Patent No.: US 8,670,419 B2
(45) Date of Patent: Mar. 11, 2014

(54) METHODS AND APPARATUS FOR INTRA-USER QUALITY OF SERVICE UPLINK SCHEDULING

(75) Inventors: Tom Chin, San Diego, CA (US); Kuo-Chun Lee, San Diego, CA (US); Chun Woo Lee, San Ramon, CA (US); Jong Ro Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1257 days.

(21) Appl. No.: 12/137,542

(22) Filed: Jun. 12, 2008

(65) Prior Publication Data

US 2009/0196262 A1 Aug. 6, 2009

Related U.S. Application Data

(60) Provisional application No. 61/025,688, filed on Feb. 1, 2008.

(51) Int. Cl.
*H04J 3/00* (2006.01)
*H04B 1/16* (2006.01)

(52) U.S. Cl.
USPC ........................................ 370/336; 455/343.4

(58) Field of Classification Search
USPC .......................................................... 370/336
See application file for complete search history.

(56) References Cited

U.S. PATENT DOCUMENTS

| 7,457,973 | B2 * | 11/2008 | Liu ................................. 713/310 |
| 7,599,321 | B2 * | 10/2009 | Lee et al. ....................... 370/320 |
| 7,633,863 | B2 * | 12/2009 | Kim et al. ...................... 370/230 |
| 7,944,990 | B2 * | 5/2011 | Lee ................................. 375/295 |
| 7,948,936 | B2 * | 5/2011 | Lohr et al. ..................... 370/329 |
| 8,014,325 | B2 * | 9/2011 | Izumikawa et al. ........... 370/310 |
| 8,045,561 | B1 * | 10/2011 | Varma et al. ................. 370/395.4 |
| 2003/0103525 | A1 * | 6/2003 | Wahl ............................. 370/465 |
| 2004/0210619 | A1 | 10/2004 | Balachandran et al. |
| 2005/0047416 | A1 * | 3/2005 | Heo et al. ................... 370/395.4 |
| 2005/0063330 | A1 * | 3/2005 | Lee et al. ....................... 370/328 |
| 2006/0233190 | A1 | 10/2006 | Huang et al. |

(Continued)

FOREIGN PATENT DOCUMENTS

| CN | 101035139 A | 9/2007 |
| JP | 2007028638 A | 2/2007 |

(Continued)

OTHER PUBLICATIONS

"802.16 IEEE Standard for Local and metropolitan area networks, Part 16: Air Interface for Fixed Broadband Wireless Access Systems"[Online] Oct. 1, 2004, pp. 138-142, XP002530920 IEEE, New York, NY, US Retrieved from the Internet: URL:http://standards.i eee.org/geti eee802/download/802.16-2004.pdf> [retrieved on Jun. 5, 2009] the whole document.

(Continued)

*Primary Examiner* — Guang Li
(74) *Attorney, Agent, or Firm* — Paul Kuo

(57) ABSTRACT

A method for intra-user quality of service (QoS) uplink scheduling may include determining scheduling types associated with active uplink connections that are maintained by the subscriber station. The method may also include determining QoS parameters corresponding to the different scheduling types. The method may also include scheduling the active uplink connections for uplink transmissions based on the different scheduling types and their corresponding QoS parameters.

48 Claims, 16 Drawing Sheets

(56) References Cited

U.S. PATENT DOCUMENTS

| | | | |
|---|---|---|---|
| 2007/0019599 A1 | 1/2007 | Park et al. | |
| 2007/0047553 A1* | 3/2007 | Matusz et al. | 370/395.42 |
| 2007/0058544 A1* | 3/2007 | Kim et al. | 370/230 |
| 2007/0099647 A1* | 5/2007 | Lee et al. | 455/522 |
| 2007/0121542 A1* | 5/2007 | Lohr et al. | 370/329 |
| 2007/0147341 A1* | 6/2007 | Izumikawa et al. | 370/351 |
| 2007/0183380 A1* | 8/2007 | Rensburg et al. | 370/338 |
| 2007/0206545 A1* | 9/2007 | Lee et al. | 370/338 |
| 2007/0297386 A1* | 12/2007 | Zhang et al. | 370/344 |
| 2008/0080378 A1* | 4/2008 | Kim et al. | 370/234 |

FOREIGN PATENT DOCUMENTS

| | | |
|---|---|---|
| RU | 2277762 | 6/2006 |
| WO | WO0232179 A1 | 4/2002 |
| WO | WO2005034443 | 4/2005 |
| WO | WO2005109792 A1 | 11/2005 |
| WO | WO2006037492 A1 | 4/2006 |
| WO | WO2007029071 A2 | 3/2007 |

OTHER PUBLICATIONS

Claudio Cicconetti et al: "Quality of Service Support in IEEE 802.16 Networks" IEEE Network, IEEE Service Center, New York, NY, US, Apr. 1, 2006, pp. 50-55, XP002457916 ISSN: 0890-8044 figure 2 p. 51-p. 53.

International Search Report and the Written Opinion—PCT/US2009/032708 International Search Authority—European Patent Office—Jul. 7, 2009.

Jianfeng Chen et al: "A service flow management strategy for IEEE 802.16 broadband wireless access systems in TDD mode" Communications, 2005. ICC 2005. 2005 IEEE International Conference on Seoul, Korea May 16-20, 2005, Piscataway, NJ, USA,IEEE, vol. 5, May 16, 2005, pp. 3422-3426, XP010825893 ISBN: 978-0-7803-8938-0 p. 3422-p. 3423; figure 2.

Jinyoung Oh et al: "A Packet-by-Packet Scheduling Algorithm for Wireless Multimedia Systems" Vehicular Technology Conference, 2007. VTC-2007.

Fall. 2007 IEEE 66TH, IEEE, PI, Sep. 1, 2007, pp. 1782-1786, XP031147714 ISBN: 978-1-4244-0263-2 p. 1782-p. 1783; figure 1.

Xiaofeng Bai et al: "WLC22-3: New Distributed QoS Control Scheme for IEEE 802.16 Wireless Access Networks" Global Telecommunications Conference, 2006. GLOBECOM 06. IEEE, IEEE, PI Nov. 1, 2006, pp. 1-5, XP031075743.

J. Sun et al., "Quality of Service Scheduling for 802.16 Broadband Wireless Access Systems", Vehicular Technology Conference, 2006. VTC 2006-Spring. IEEE 63rd, May 7-10, 2006 , pp. 1221-1225.

Liu Q., et al., "A Cross-Layer Scheduling Algorithm With QoS Support in Wireless Networks", IEEE Transactions on Vehicular Technology, May 1, 2006, XP55013998.

Taiwan Search Report—TW098103307—TIPO—May 24, 2012.

* cited by examiner

| SCHEDULING TYPE | PRIORITY |
|---|---|
| Unsolicited Grant Service (UGS) | 1 |
| Real-Time Polling Service (rtPS) | 2 |
| Extended Real-Time Polling Service (ertPS) | 2 |
| Non-Real-Time Polling Service (nrtPS) | 3 |
| Best Effort (BE) | 4 |

FIG. 5

| SCHEDULING TYPE | QoS PARAMETERS |
|---|---|
| Unsolicited Grant Service (UGS) | Maximum Sustained Traffic Rate — 614a<br>Maximum Latency — 614b |
| Real-Time Polling Service (rtPS) | Maximum Sustained Traffic Rate — 614a<br>Minimum Reserved Traffic Rate — 614c<br>Maximum Latency — 614b |
| Extended Real-Time Polling Service (ertPS) | Maximum Sustained Traffic Rate — 614a<br>Minimum Reserved Traffic Rate — 614c<br>Maximum Latency — 614b |
| Non-Real-Time Polling Service (nrtPS) | Maximum Sustained Traffic Rate — 614a<br>Minimum Reserved Traffic Rate — 614c |
| Best Effort (BE) | Maximum Sustained Traffic Rate — 614a |

FIG. 6

METHODS AND APPARATUS FOR INTRA-USER QUALITY OF SERVICE UPLINK SCHEDULING

PRIORITY CLAIM

This application claims the benefit of priority from U.S. Provisional Patent Application Ser. No. 61/025,688, entitled "Intra-User UL Scheduling and QoS UL Algorithms at the WiMAX Mobile Station Based on Scheduling Types" and filed Feb. 1, 2008, which is fully incorporated herein by reference for all purposes.

TECHNICAL FIELD

The present disclosure relates generally to wireless communication technology. More specifically, the present disclosure relates to methods and apparatus for intra-user quality of service up link scheduling.

BACKGROUND

As used herein, the term "subscriber station" refers to an electronic device that may be used for voice and/or data communication over a wireless communication network. Examples of subscriber stations include cellular phones, personal digital assistants (PDAs), handheld devices, wireless modems, laptop computers, personal computers, etc. A subscriber station may alternatively be referred to as a mobile station, a mobile terminal, an access terminal, a remote station, a user terminal, a terminal, a subscriber unit, user equipment, etc.

A wireless communication network may provide communication for a number of subscriber stations, each of which may be serviced by a base station. A base station may alternatively be referred to as an access point, a Node B, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication network (e.g., bandwidth and transmit power) may be shared among multiple subscriber stations. A variety of multiple access techniques are known, including code division multiple access (CDMA), time division multiple access (TDMA), frequency division multiple access (FDMA), and orthogonal frequency division multiple access (OFDMA).

BRIEF DESCRIPTION OF THE DRAWINGS

FIG. 5 illustrates an example of a data structure that prioritizes different scheduling types;

FIG. 6 illustrates an example of a data structure that associates quality of service (QoS) parameters with different scheduling types;

SUMMARY

Figure 1:
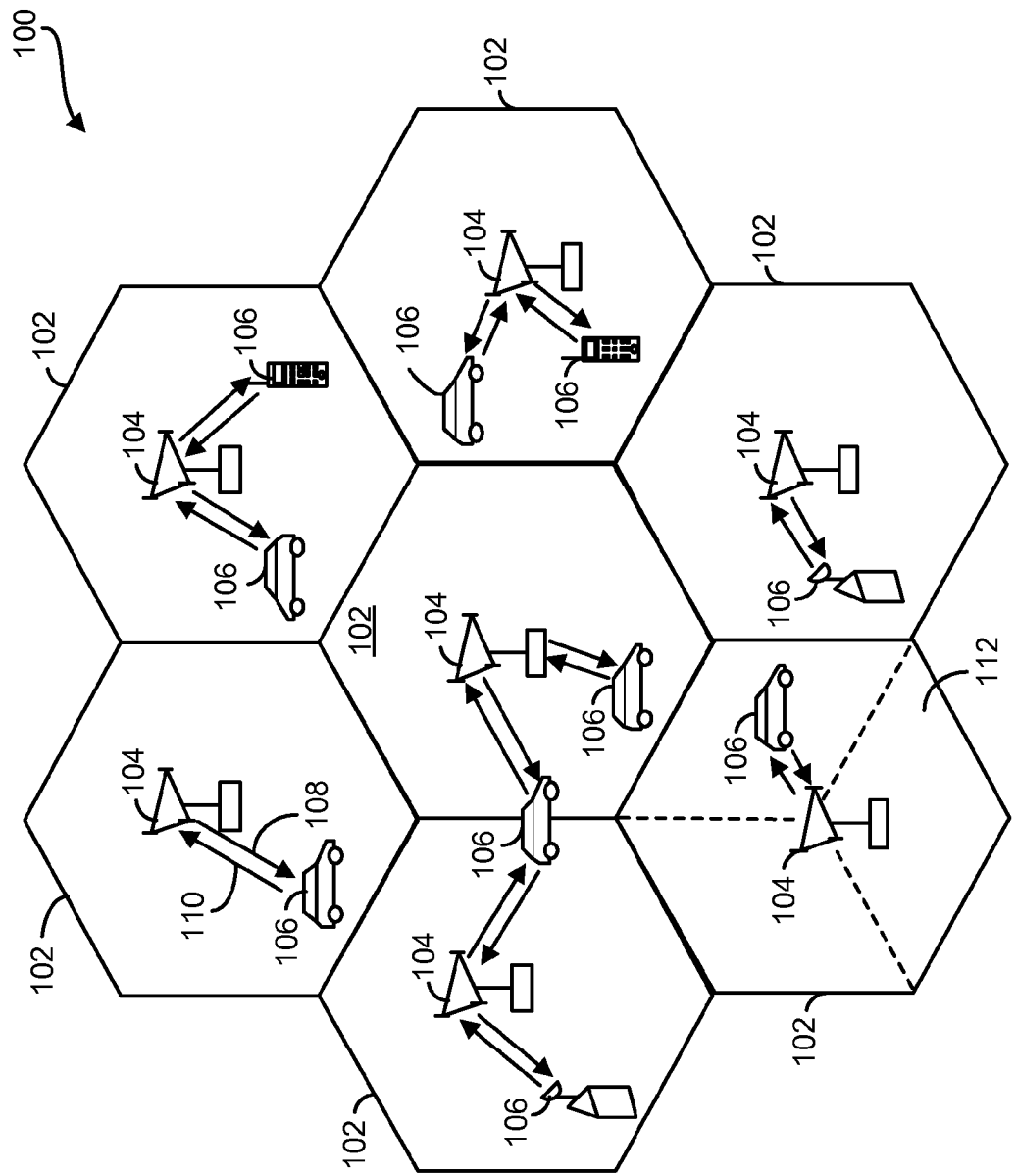
FIG. 1 illustrates an example of a wireless communication network.

A method for intra-user quality of service (QoS) uplink scheduling is disclosed. The method may be implemented by a subscriber station. The method may include determining scheduling types associated with active uplink connections that are maintained by the subscriber station. The method may also include determining QoS parameters corresponding to the different scheduling types. The method may also include scheduling the active uplink connections for uplink transmissions based on the different scheduling types and their corresponding QoS parameters.

A subscriber station that is configured for intra-user quality of service (QoS) uplink scheduling is disclosed. The subscriber station includes a processor and memory in electronic communication with the processor. Instructions are stored in the memory. The instructions may be executable by the processor to determine scheduling types associated with active uplink connections that are maintained by the subscriber station. The instructions may also be executable by the processor to determine QoS parameters corresponding to the different scheduling types. The instructions may also be executable by the processor to schedule the active uplink connections for uplink transmissions based on the different scheduling types and their corresponding QoS parameters.

A subscriber station that is configured for intra-user quality of service (QoS) uplink scheduling is disclosed. The subscriber station may include means for determining scheduling types associated with active uplink connections that are maintained by the subscriber station. The subscriber station may also include means for determining QoS parameters corresponding to the different scheduling types. The subscriber station may also include means for scheduling the active uplink connections for uplink transmissions based on the different scheduling types and their corresponding QoS parameters.

A computer-program product for facilitating intra-user quality of service (QoS) uplink scheduling is disclosed. The computer-program product includes a computer-readable medium having instructions thereon. The instructions may include code for determining scheduling types associated with active uplink connections that are maintained by the subscriber station. The instructions may also include code for determining QoS parameters corresponding to the different scheduling types. The instructions may also include code for scheduling the active uplink connections for uplink transmissions based on the different scheduling types and their corresponding QoS parameters.

DETAILED DESCRIPTION

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances.

Some of the examples described herein are relevant to wireless communication networks that are configured in accordance with WiMAX standards. However, these examples should not be interpreted as limiting the scope of the present disclosure.

WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication networks. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

FIG. 1 illustrates an example of a wireless communication network 100. The wireless communication network 100 provides communication for a number of cells 102, each of which is serviced by a base station 104. A base station 104 may be a fixed station that communicates with subscriber stations 106. The base station 104 may alternatively be referred to as an access point, a Node B, or some other terminology.

FIG. 1 shows various subscriber stations 106 dispersed throughout the network 100. The subscriber stations 106 may be fixed (i.e., stationary) or mobile. The subscriber stations 106 may alternatively be referred to as mobile stations, mobile terminals, access terminals, remote stations, user terminals, terminals, subscriber units, user equipment, etc. The subscriber stations 106 may be wireless devices, such as cellular phones, personal digital assistants (PDAs), handheld devices, wireless modems, laptop computers, personal computers, etc.

A variety of algorithms and methods may be used for transmissions in the wireless communication network 100 between the base stations 104 and the subscriber stations 106. For example, signals may be sent and received between the base stations 104 and the subscriber stations 106 in accordance with orthogonal frequency division multiple access (OFDMA), code division multiple access (CDMA), time division multiple access (TDMA), frequency division multiple access (FDMA), etc.

A communication link that facilitates transmission from a base station 104 to a subscriber station 106 may be referred to as a downlink 108, and a communication link that facilitates transmission from a subscriber station 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within the wireless communication network 100 may utilize antennas that concentrate the flow of power within a particular sector 112 of the cell 102.

Figure 2:
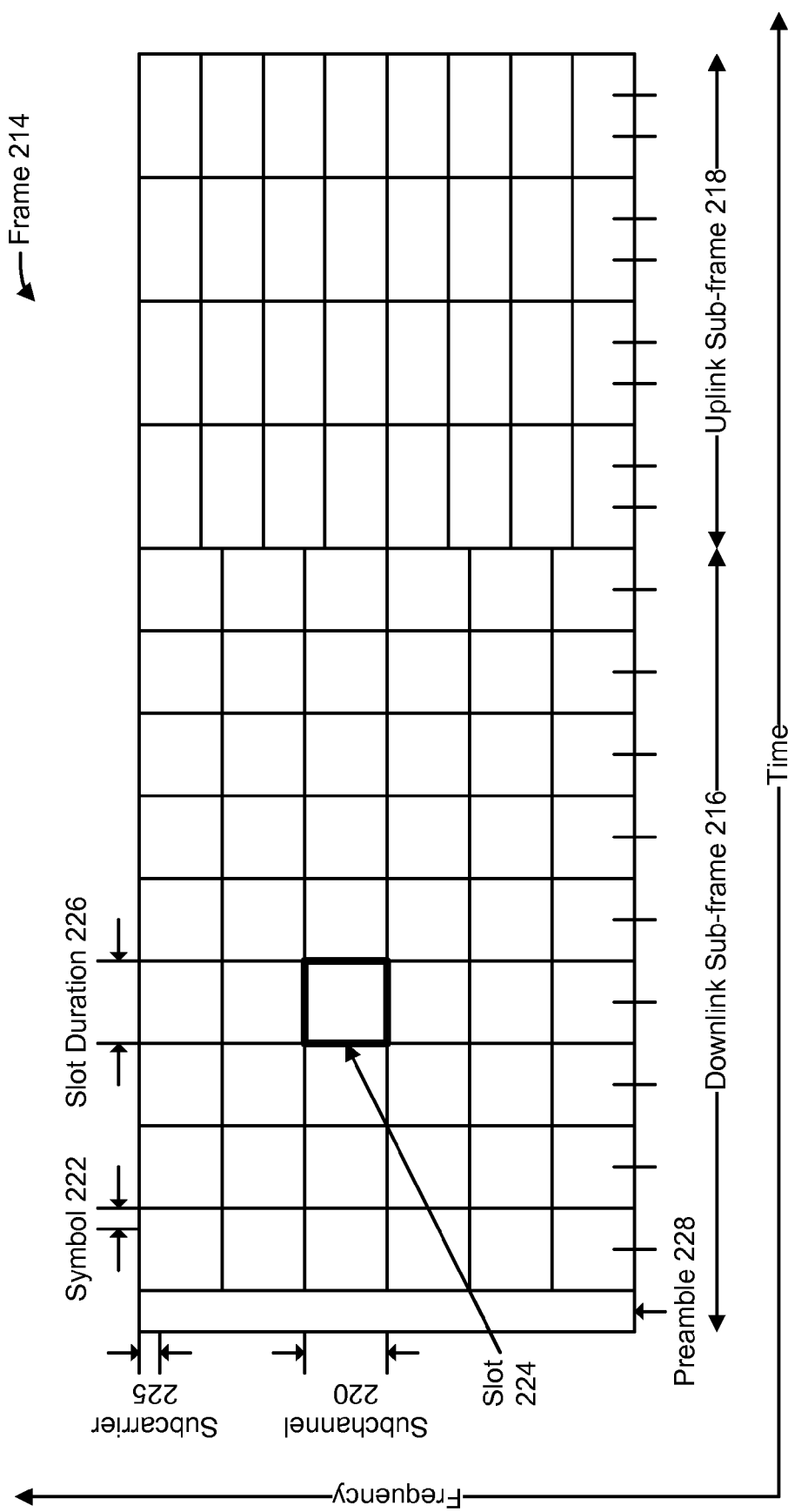
FIG. 2 illustrates an example showing certain aspects of the structure of a frame in a WiMAX network.

FIG. 2 illustrates an example showing certain aspects of the structure of a frame 214 in a WiMAX network. In a WiMAX network, a frame 214 is a time interval of constant length. For time division duplex (TDD) operation, each frame 214 is divided into a downlink (DL) sub-frame 216 and an uplink (UL) sub-frame 218. The downlink sub-frame 216 begins with a preamble 228.

In a WiMAX network, a slot 224 is the smallest unit to allocate bandwidth to users. A slot 224 is a subchannel 220 (i.e., a group of subcarriers 225) over a slot duration 226 (i.e., a certain number of symbols 222).

Figure 3:
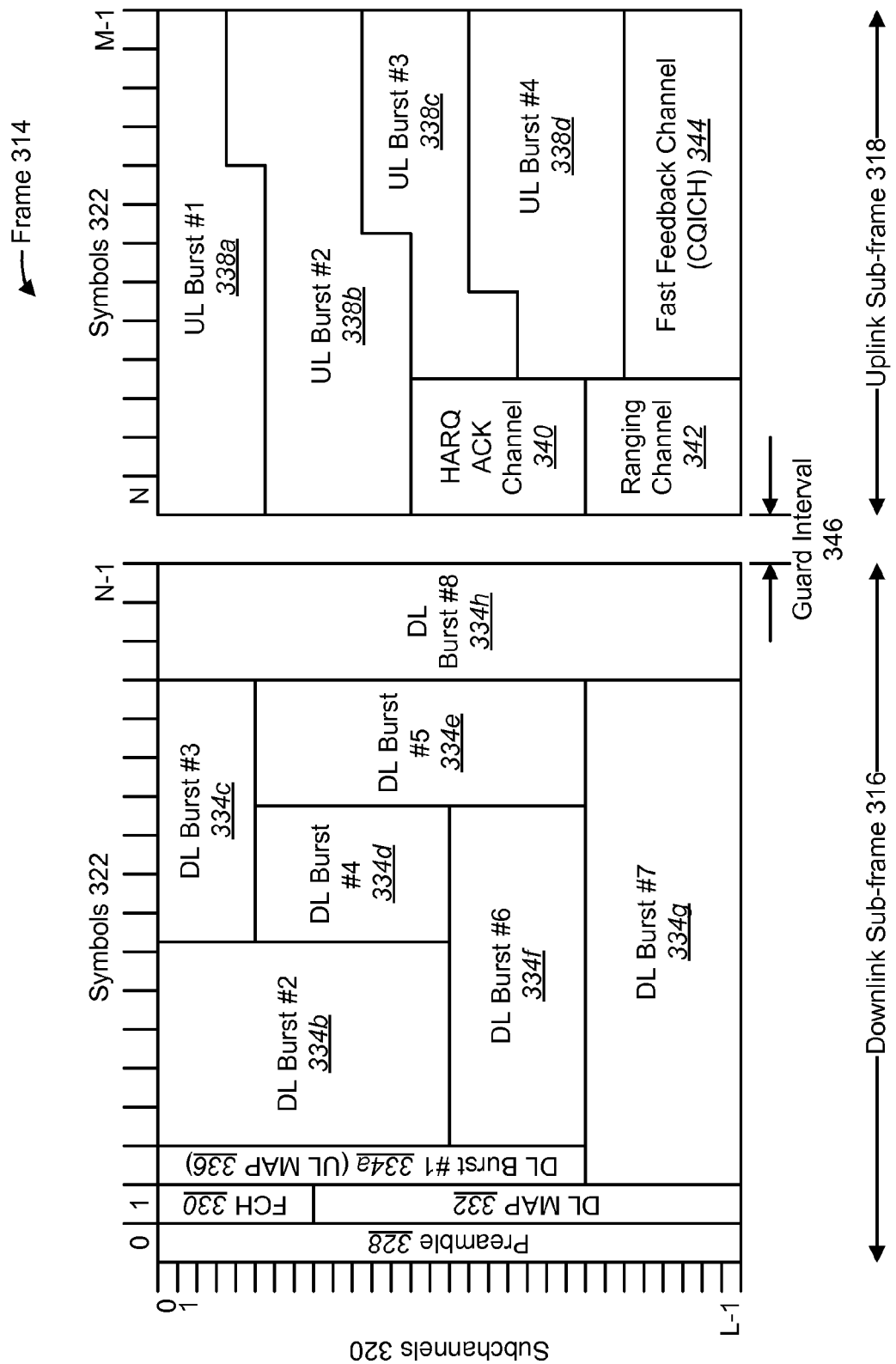
FIG. 3 illustrates an example showing certain additional aspects of the structure of a frame in a WiMAX network.

FIG. 3 illustrates an example showing certain additional aspects of the structure of a frame 314 in a WiMAX network. The frame 314 includes a downlink sub-frame 316 and an uplink sub-frame 318, separated by a guard interval 346. The frame 314 is transmitted over L subchannels 320. There are a total of M symbols 322 in the frame 314, N symbols 322 in the downlink sub-frame 316 and M-N symbols in the uplink sub-frame 318.

The downlink sub-frame 316 includes a preamble 328. The preamble 328 is used for physical layer procedures, such as time and frequency synchronization and initial channel estimation. The downlink sub-frame 316 also includes a frame control header (FCH) 330. The FCH 330 provides frame 314 configuration information, such as the MAP message length, the modulation and coding scheme, and the usable subcarriers 225.

Multiple users are allocated data regions within the frame 314, and these allocations are specified in the downlink MAP message 332 and the uplink MAP message 336. The MAP messages 332, 336 include the burst profile for each user, which defines the modulation and coding scheme that are used.

The downlink sub-frame 316 also includes multiple downlink bursts 334*a-h*. The first downlink burst 334*a* is typically the uplink MAP message 336. The downlink bursts 334*a-h* may be of varying size and type, and may carry data for several users.

The uplink sub-frame 318 includes multiple uplink bursts 338*a-d*, which may be from different users. The uplink sub-frame also includes a ranging channel 342, which may be used to perform closed-loop frequency, time, and power adjustments during network entry as well as periodically afterward. The ranging channel 342 may also be used by subscriber stations 106 to make uplink bandwidth requests.

The uplink sub-frame 318 also includes a channel-quality indicator channel (CQICH) 344 for the subscriber stations 106 to feed back channel-quality information that can be used by the scheduler at the base station 104. The CQICH 344 may also be referred to as a fast feedback channel 344. The uplink sub-frame 318 also includes a hybrid automatic repeat request (HARQ) acknowledgement (ACK) channel 340, which may be used by subscriber stations 106 to feed back downlink acknowledgements.

Figure 4:
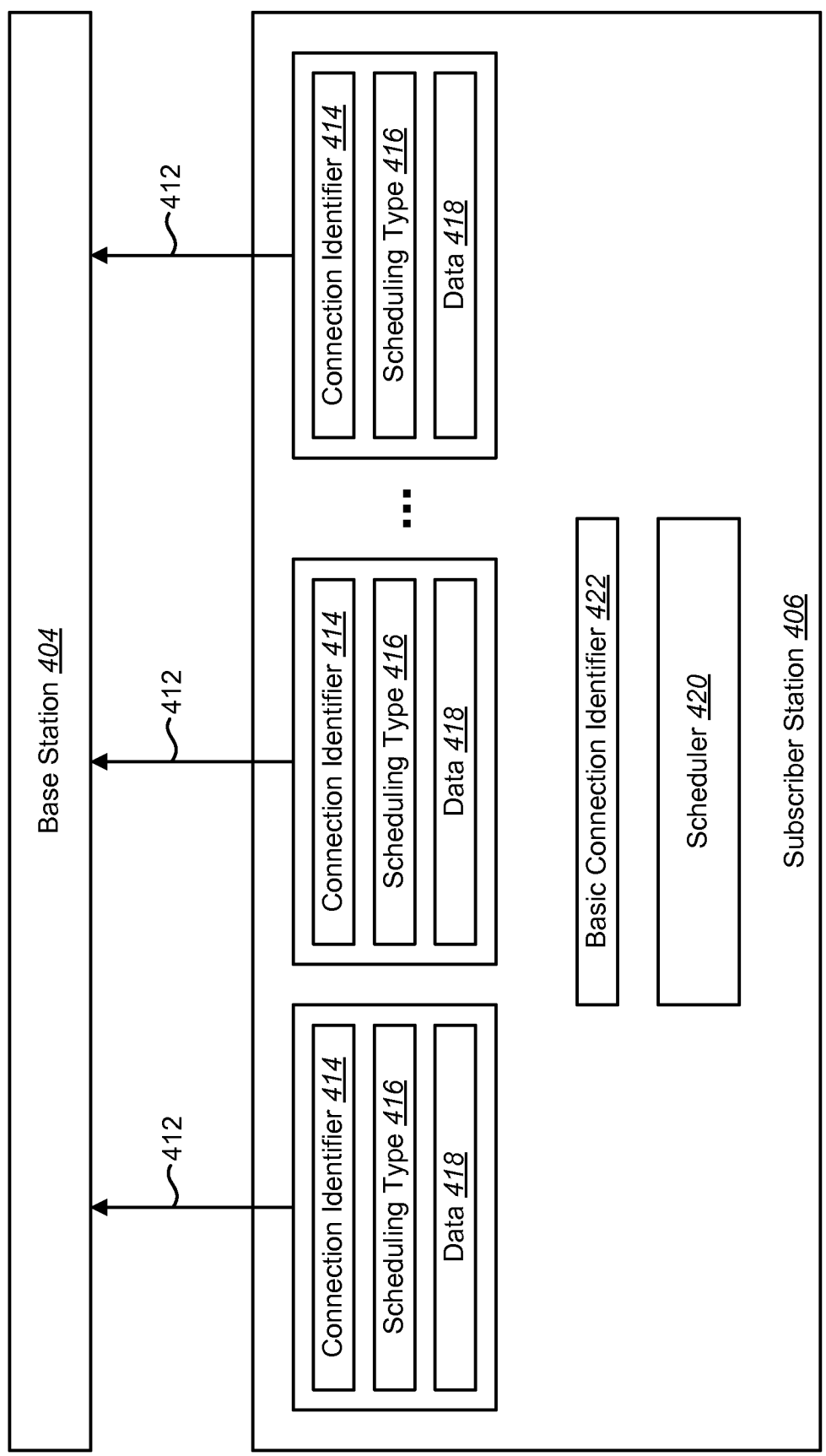
FIG. 4 illustrates multiple uplink connections between a subscriber station and a base station.

FIG. 4 illustrates multiple uplink connections 412 between a subscriber station 406 and a base station 404. Each uplink connection 412 may be associated with a connection identifier 414.

Each uplink connection 412 may also be associated with a scheduling type 416. The following scheduling types 416 for uplink connections 412 are defined in the IEEE 802.16 standard: UGS (unsolicited grant service), ertPS (extended real-time polling service), rtPS (real-time polling service), nrtPS (non-real-time polling service), and BE (best effort).

The unsolicited grant service is designed to support fixed-size data packets at a constant bit rate. The real-time polling service is designed to support real-time service flows (e.g., streaming video). The non-real-time polling service is designed to support delay-tolerant data streams that require variable-size data grants at a minimum guaranteed rate (e.g., FTP). The best-effort service is designed to support data streams that do not require a minimum service-level guarantee (e.g., web browsing). The extended real-time polling service is designed to support real-time applications that have variable data rates but require guaranteed data rate and delay (e.g., voice over IP with silence suppression).

There may be data 418 to transmit for each of the uplink connections 412. In WiMAX standards, the uplink (UL) bandwidth grant is addressed to the subscriber station's Basic Connection ID (CID) 422. However, the subscriber station 406 may have multiple active uplink connections 412. Therefore, a scheduler 420 may be provided to schedule these multiple active connections 412 to use the allocated uplink bandwidth. The scheduler 420 may perform the following two functions: deciding the priority order, and allocating uplink transmission bytes.

FIG. 5 illustrates an example of a data structure 510 that prioritizes different scheduling types 512. The data structure 510 may be stored in memory within a subscriber station 406. The information that is contained within the data structure 510 may alternatively be stored in multiple data structures 510.

The unsolicited grant service (UGS) 512a may be the highest priority 514a. The real-time polling service (rtPS) 512b and the extended real-time polling service (ertPS) 512c may be the next highest priority 514b. The non-real-time polling service (nrtPS) 512d may be the next highest priority 514c. The best effort (BE) 512e service may be the next highest priority 514d.

The subscriber station 406 may use the scheduling type 512 for the priority 514 order in uplink transmission. As shown, the priority 514 of scheduling types 512 in descending order may be: UGS 512a>rtPS 512b or ertPS 512c>nrtPS 512d>BE 512e. Scheduling types rtPS 512b and ertPS 512c may be treated as the same priority 514. Connections 412 of higher priority 514 scheduling types 512 may have precedence over connections 412 of lower priority 514 scheduling types 512 in scheduling.

FIG. 6 illustrates an example of a data structure 610 that associates quality of service (QoS) parameters 614 with different scheduling types 612. The data structure 610 may be stored in memory within a subscriber station 406. The information that is contained within the data structure 610 may alternatively be stored in multiple data structures 610.

The unsolicited grant service (UGS) 612a may be associated with a maximum sustained traffic rate 614a and a maximum latency 614b. The real-time polling service (rtPS) 612b and the extended real-time polling service (ertPS) 612c may be associated with a maximum sustained traffic rate 614a, a maximum latency 614b, and a minimum reserved traffic rate 614c. The non-real-time polling service (nrtPS) 612d may be associated with a maximum sustained traffic rate 614a and a minimum reserved traffic rate 614c. The best effort (BE) 612e service may be associated with a maximum sustained traffic rate 614a.

The maximum sustained traffic rate 614a may be denoted as $Max\_R_i$. The maximum latency 614b may be denoted as $Max\_T_i$. The minimum reserved traffic rate 614c may be denoted as $Min\_R_i$. The index i is the connection index, such as the transport CID 414.

The present disclosure proposes a method for the subscriber station 406 to schedule uplink transmission considering different scheduling types 512 and their QoS parameters 614. The base station 404 may send the uplink map (UL-MAP) 336 to signal that some uplink bandwidth is allocated to the subscriber station 406. When the subscriber station 406 receives the UL-MAP 336 that allocates this subscriber station 406 for uplink transmission, the subscriber station 406 may calculate the number of bytes available from the number of slots and the modulation/coding scheme allocated by the UL-MAP 336. The scheduler 420 may assign the number of available data bytes to the uplink connections 412 with data 418 waiting for transmission.

Figures 7, 8:
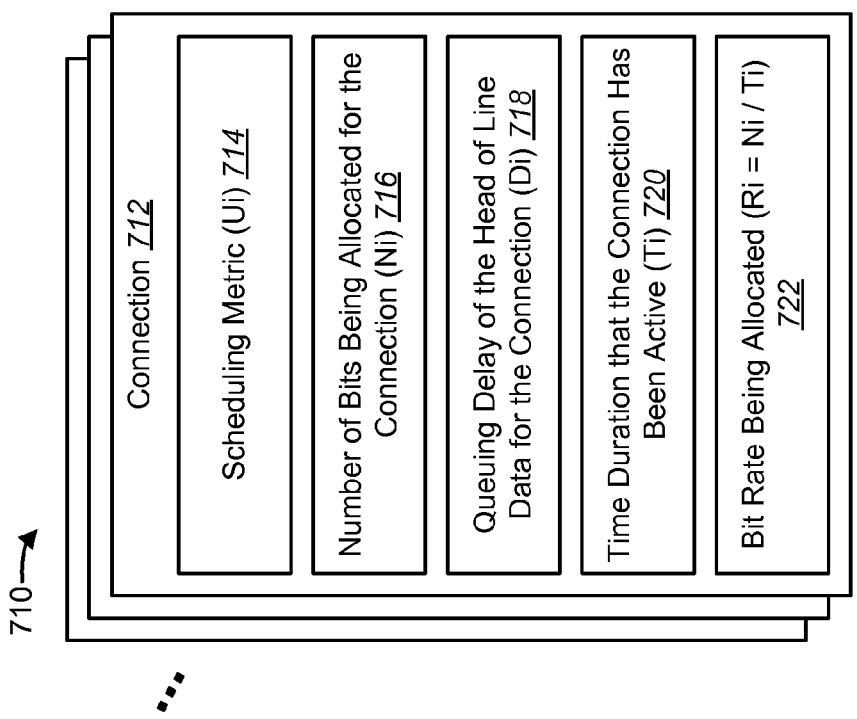
FIG. 7 illustrates an example of a data structure that stores certain information for each of the active connections that are maintained by a subscriber station.
FIG. 8 illustrates an example of a priority list that may be created during scheduling at the subscriber station.

FIG. 7 illustrates an example of a data structure 710 that stores certain information for each of the active connections 712 that are maintained by a subscriber station 406. The data structure 710 may be stored in memory within a subscriber station 406. The information that is contained within the data structure 710 may alternatively be stored in multiple data structures 710.

If there is more than one connection 412 of the same scheduling type 512, the scheduler 420 may use a certain scheduling metric 714 to decide the order in allocating bandwidth. A scheduling metric 714 may be determined for each active connection 712. The scheduling metric 714 may be referred to as Ui. The scheduling metric 714 may be used to select the connection 712 for which data 418 is transmitted when uplink bandwidth is allocated to a subscriber station 406. For example, the scheduler 420 may initially determine whether there are any connections 712 of scheduling type UGS 512a, because this may be the highest priority 514a (as shown in FIG. 5). If there are multiple connections 712 of scheduling type UGS 512a, then the scheduler 420 may select the connection 712 of scheduling type UGS 512a that has the highest scheduling metric 714.

For each connection 712, a parameter 716 that indicates the number of bits being allocated for the connection 712 may be determined. This parameter 716 may be referred to as Ni. This parameter 716 may be used in the calculation of the scheduling metric 714 for the connection 712.

Also, for each connection 712, a parameter 718 that indicates the queuing delay of the head of line data for the connection 712 may be determined. This parameter 718 may be referred to as Di. This parameter 718 may be used in the calculation of the scheduling metric 714 for the connection 712.

Also, for each connection 712, a parameter 720 that indicates the time duration that the connection 712 has been active may be determined. This parameter 720 may be referred to as Ti. This parameter 720 may be used in the calculation of the scheduling metric 714 for the connection 712.

Also, for each connection 712, a parameter 722 that indicates the traffic rate (e.g., bit rate) being allocated may be determined. This parameter 722 may be referred to as Ri, and it may be calculated as Ni/Ti. This parameter 722 may be used in the calculation of the scheduling metric 714 for the connection 712.

The calculation of the scheduling metric 714 for a particular connection 712 may depend on the scheduling type 416 of the connection 712. This will be described in greater detail below.

FIG. 8 illustrates an example of a priority list 820 that may be created during scheduling at the subscriber station 406. The priority list 820 may include a separate entry 822 in the priority list 820 for each active uplink connection 412. Each active uplink connection 412 may be identified in the priority list 820 by the corresponding connection identifier 414.

For each active uplink connection 412, the priority list 820 may include the corresponding scheduling type 512. The entries 822 in the priority list 820 may be sorted based on the scheduling type 512. In other words, connections 412 of higher priority 514 scheduling types 512 may have a higher priority 824 over connections 412 of lower priority 514 scheduling types 512 in scheduling.

In addition, for each active uplink connection 412, the priority list 820 may include the corresponding scheduling metric 714. The entries 822 in the priority list 820 may be sorted based on the scheduling metric 714. The connection 412 that has the highest scheduling metric 714 may be given the highest priority 824 in the priority list 820, among connections 412 of the same scheduling type 512.

Figure 9:
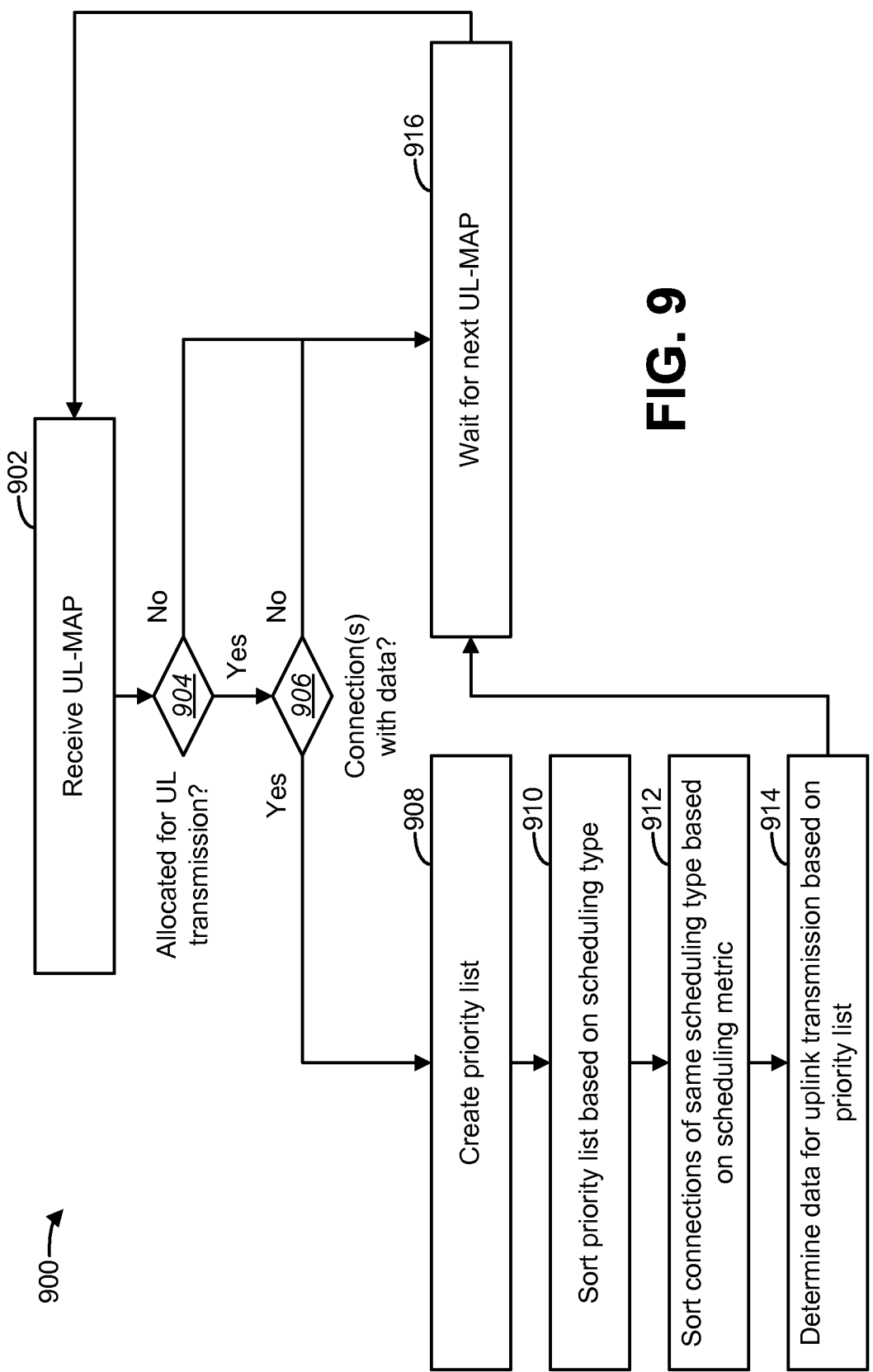
FIG. 9 illustrates an example of a method for scheduling uplink connections.

FIG. 9 illustrates an example of a method 900 for scheduling uplink connections 412. The method 900 may be implemented by a scheduler 420 at a subscriber station 406.

The method 900 may include receiving 902 a UL-MAP message 336. The UL-MAP message 336 may indicate whether any uplink bandwidth has been allocated to the subscriber station 406 for the next uplink sub-frame 318. If it is determined 904 that uplink bandwidth has been allocated to the subscriber station 406, and if it is determined 906 that there is at least one active uplink connection 412 with data 418 to transmit, then the method 900 may include creating 908 a priority list 820.

The method 900 may also include sorting 910 the connections 412 in the priority list 820 based on the scheduling type 512. In other words, connections 412 of higher priority 514 scheduling types 512 may have precedence over connections 412 of lower priority 514 scheduling types 512 in scheduling.

Under some circumstances, there may be multiple active connections 412 of the same scheduling type 512 with data 418 to transmit. In this situation, the scheduling metric 714 may be used to decide the precedence. For example, the method 900 may also include sorting 912 the connections 412 of the same scheduling type 512 based on the scheduling metric 714. The connection 412 that has the highest scheduling metric 714 may be given the highest priority in the priority list 820, among connections 412 of the same scheduling type 512. If there is a tie in scheduling metrics 714, the scheduler 420 may randomly choose among the connections 412.

The method 900 may also include determining 914 the data 418 for uplink transmission based on the priority list 820. Once the priority list 820 is decided, the scheduler 420 can decide the amount of data 418 (e.g., the number of data bytes) to allocate for the various connections 412 from the top to the bottom in the priority list 820. In other words, the scheduler 420 may determine the amount of data 418 to allocate for each connection 412 for uplink transmission one connection 412 after another in the priority list 820.

The scheduler 420 may allocate all of the data 418 from a particular connection 412 before allocating the data 418 from the next connection 412 in the priority list 820. The allocation of data 418 may continue in this manner until all available data 418 is used up.

Once the available data 418 to transmit has been allocated and/or once the available bandwidth has been utilized, the method 900 may then include waiting 916 for the next UL-MAP message 336. When the next UL-MAP message 336 is received 902, the method 900 may then proceed as described above.

Thus, FIG. 9 illustrates an example of a method 900 where intra-user QoS requirements 614 are taken into consideration in scheduling uplink transmissions. In the context of the present disclosure, the term "user" may refer to a subscriber station 406 (which, as indicated above, may alternatively be referred to as a mobile station, a mobile terminal, an access terminal, a remote station, a user terminal, a terminal, a subscriber unit, user equipment, etc.). Thus, the term "intra-user" may refer to "intra-subscriber station." As discussed above, there may be multiple uplink connections 412 per user (i.e., per subscriber station 406). In accordance with the present disclosure, the scheduler 420 may prioritize the uplink connections 412 in transmission.

Figure 9A:
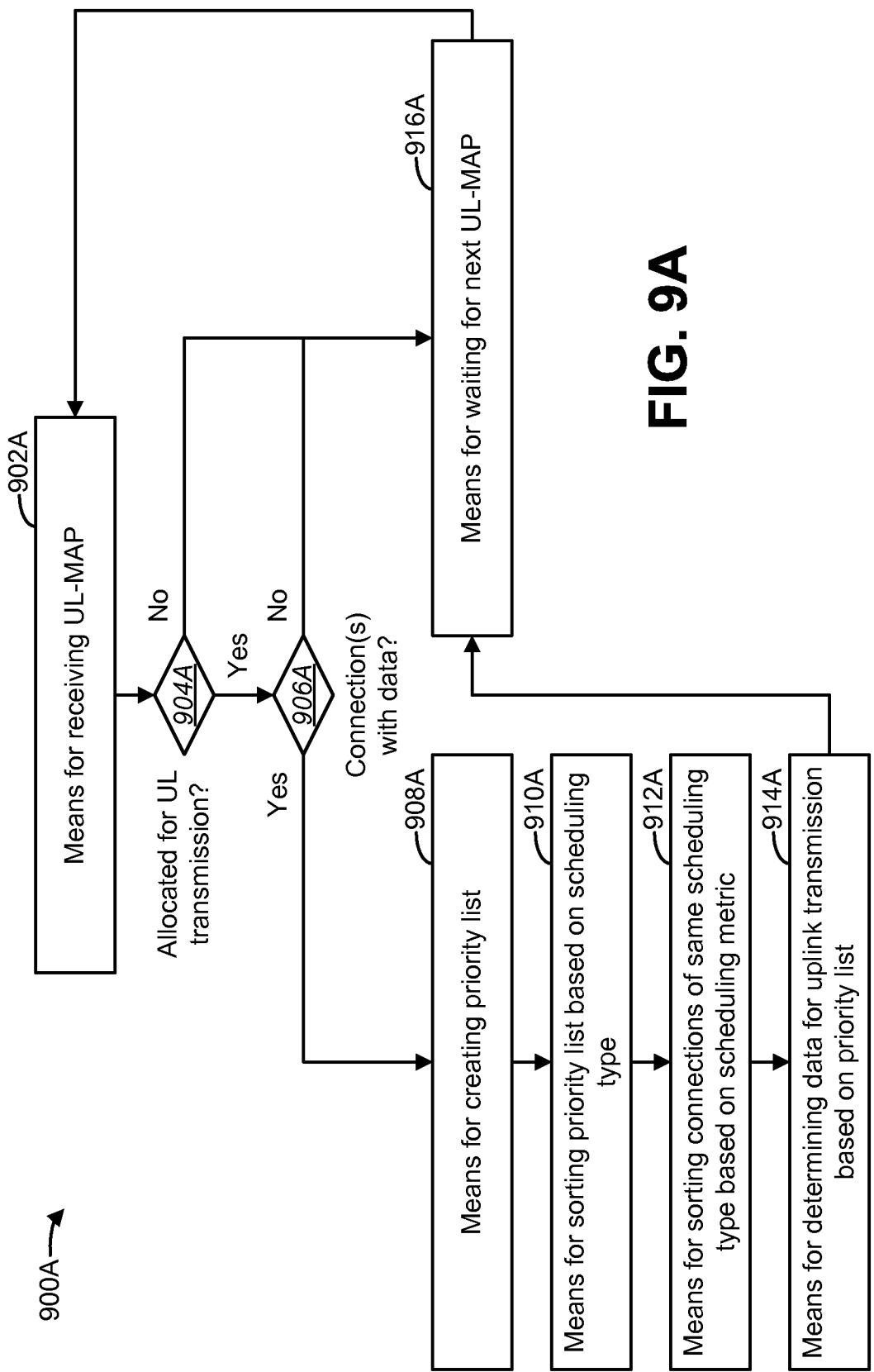
FIG. 9A illustrates means-plus-function blocks corresponding to the method of FIG. 9.

The method 900 of FIG. 9 described above may be performed by various hardware and/or software component(s) and/or module(s) corresponding to the means-plus-function blocks 900A illustrated in FIG. 9A. In other words, blocks 902 through 916 illustrated in FIG. 9 correspond to means-plus-function blocks 902A through 916A illustrated in FIG. 9A.

Some examples of equations that may be used to calculate the scheduling metrics 714 for connections 712 of different scheduling types 416 will now be discussed. These equations are provided for purposes of example only and should not be construed as limiting the scope of the present disclosure.

The scheduling metric 714 for a connection 712 of the unsolicited grant service (UGS) scheduling type 512a may be calculated as:

$$Ui = f(Ri|Max\_Ri) + g(Di|Max\_Ti)$$

$$f(Ri|Max\_Ri) = b1/(Ri/Max\_Ri), \text{ if } Ri > a*Max\_Ri;$$
$$\text{otherwise } f = b1/a$$

$$g(Di|Max\_Ti) = b2/(1 - Di/(c*Max\_Ti)), \text{ if } Di < (c-d)*Max\_Ti; \text{ otherwise } g = b2*c/d$$

The terms b1 and b2 are weights between f and g. The term a is some small constant used to protect against the denominator being zero. The term c is some percentage of latency allocated for the delay between the subscriber station 406 and the base station 404. The term d (i.e., d<c) is to protect against the denominator being zero.

Figure 10:
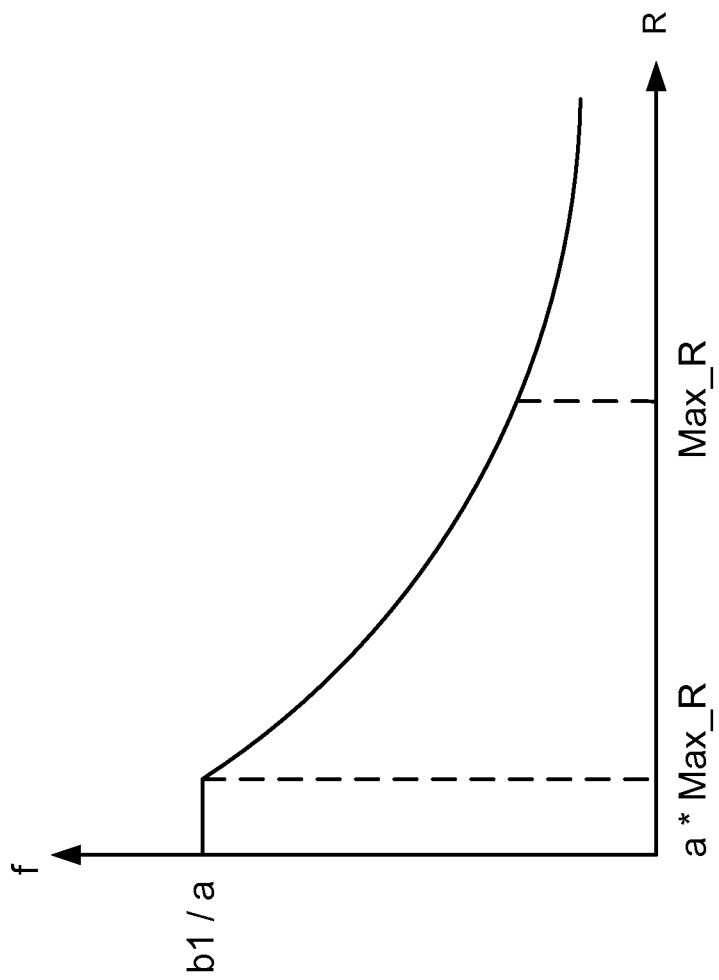
FIG. 10 illustrates a function that may be used to calculate a scheduling metric.
Figure 11:
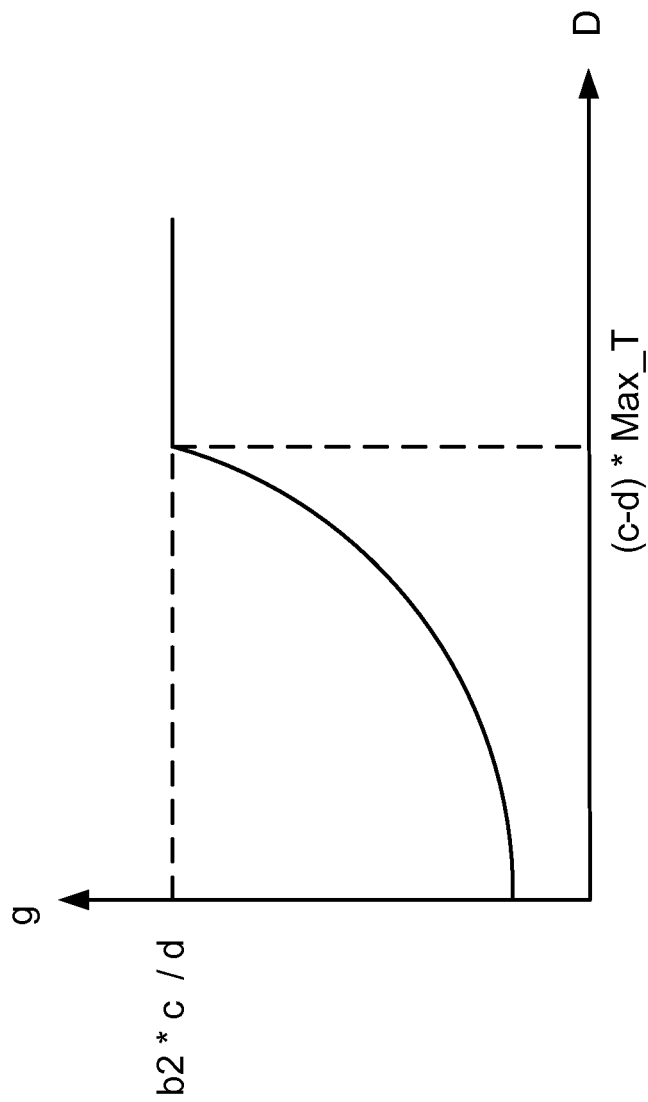
FIG. 11 illustrates another function that may be used to calculate a scheduling metric.

The functions f and g are shown in FIGS. 10 and 11, respectively. It may be seen that the function f remains a constant large value when R is small and starts to decrease. The function g starts to increase until it reaches (c−d)*Max_T beyond which it remains to be a large constant. The function g has a pole at c*Max_T to indicate a large incentive to the scheduler 420 when the delay is close to c*Max_T.

The scheduling metric 714 for a connection 712 of the real-time polling service (rtPS) scheduling type 512b or the extended real-time polling service (ertPS) scheduling type 512c may be calculated as:

$$Ui = f1(Ri|Min\_Ri, Max\_Ri) + g(Di|Max\_Ti)$$

$$f1(Ri|Min\_Ri, Max\_Ri) = b3/(Ri/Min\_Ri), \text{ if }$$
$$Ri > e*Min\_Ri \text{ and } Ri < Max\_Ri; \text{ otherwise,}$$
$$f1 = b3/e \text{ if } Ri \leq e*Min\_Ri, \text{ and } f1 = 0 \text{ if }$$
$$Ri \geq Max\_Ri$$

$$g(D_i|Max\_T_i)=b2/(1-D_i/(c*Max\_T_i)), \text{ if } D_i<(c-d)*Max\_T_i; \text{ otherwise } g=b2*c/d$$

Figure 12:
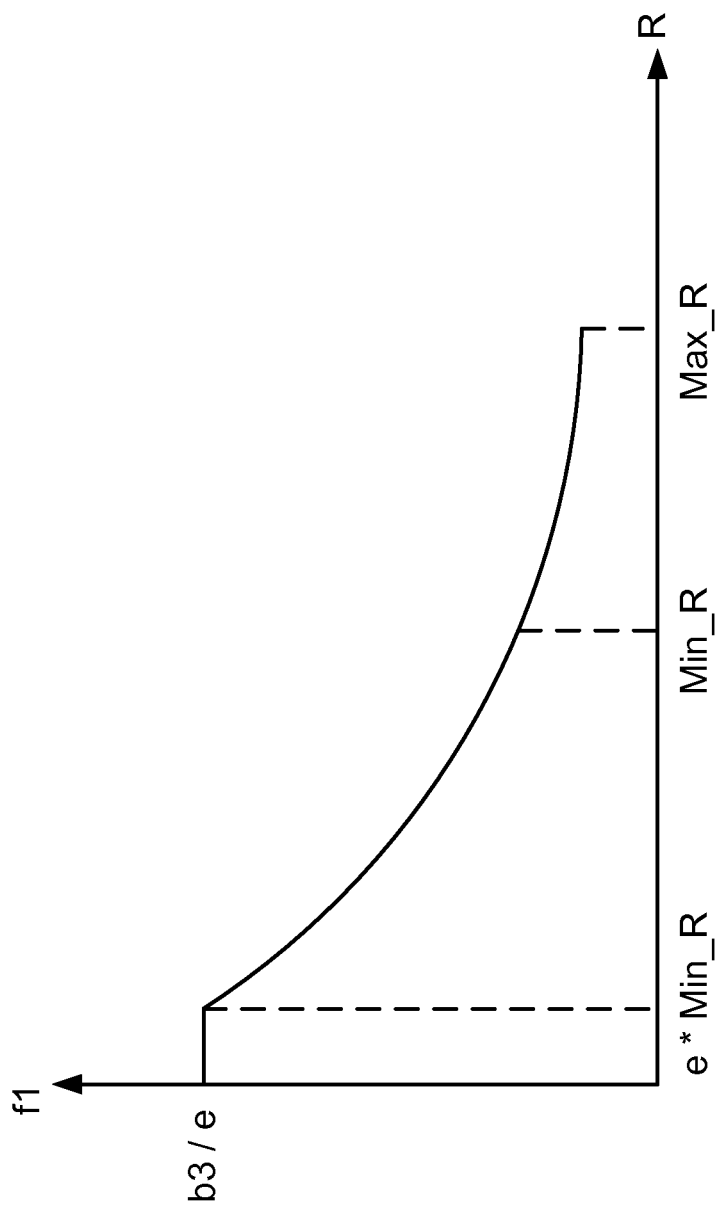
FIG. 12 illustrates another function that may be used to calculate a scheduling metric.

The terms b3 and b2 are weights between f and g. The function f1 is shown in FIG. 12. It may be seen that the function f1 remains a constant large value when R is small and starts to decrease. When R is more than Max_R, it becomes zero, which implies that the scheduler 420 does not want to schedule this connection 412 until other connections 412 of the same scheduling type 416 are scheduled.

The scheduling metric 714 for a connection 712 of the non-real-time polling service (nrtPS) scheduling type 512d may be calculated as:

$$U_i = f1(R_i|Min\_R_i, Max\_R_i)$$

$$f1(R_i|Min\_R_i, Max\_R_i) = b3/(R_i/Min\_R_i), \text{ if } R_i > e*Min\_R_i \text{ and } R_i < Max\_R_i; \text{ otherwise, } f1 = b3/e \text{ if } R_i \leq e*Min\_R_i, \text{ and } f1 = 0 \text{ if } R_i \geq Max\_R_i$$

The scheduling metric 714 for a connection 712 of the best effort (BE) scheduling type 512e may be calculated as:

$$U_i = f2(R_i|Max\_R_i)$$

$$f2(R_i|Max\_R_i) = 1, \text{ if } R_i < Max\_R_i; \text{ otherwise, } f2 = 0$$

Figure 13:
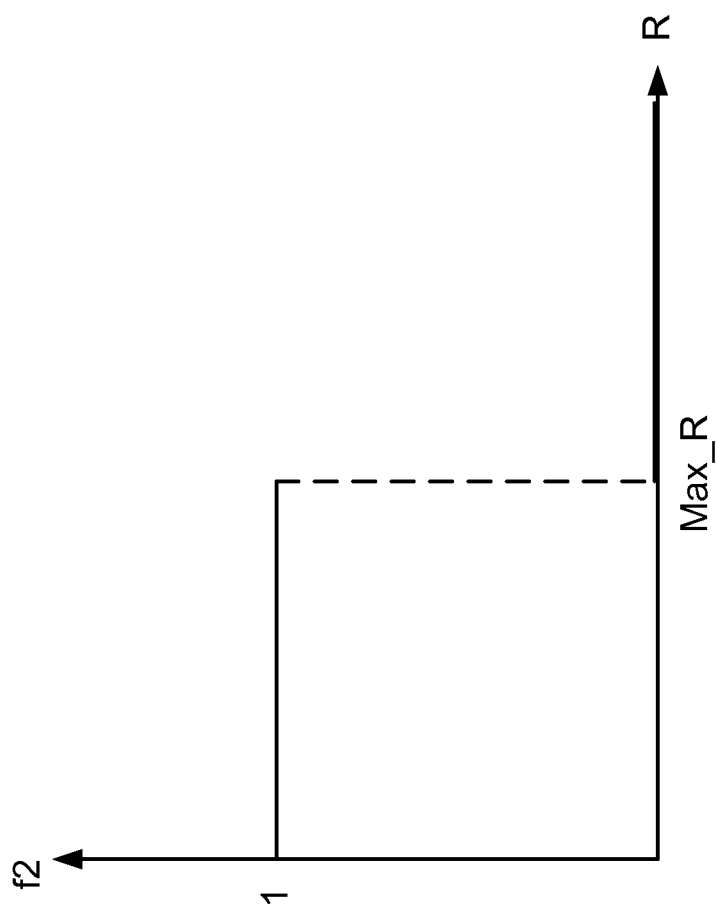
FIG. 13 illustrates another function that may be used to calculate a scheduling metric.

The function f2 is shown in FIG. 13. It may be seen that the function f2 remains a constant large value when R is less than Max_Ri, beyond which it becomes zero. This implies that if the rate is not more than the maximum, each connection 412 has the same priority.

Figure 14:
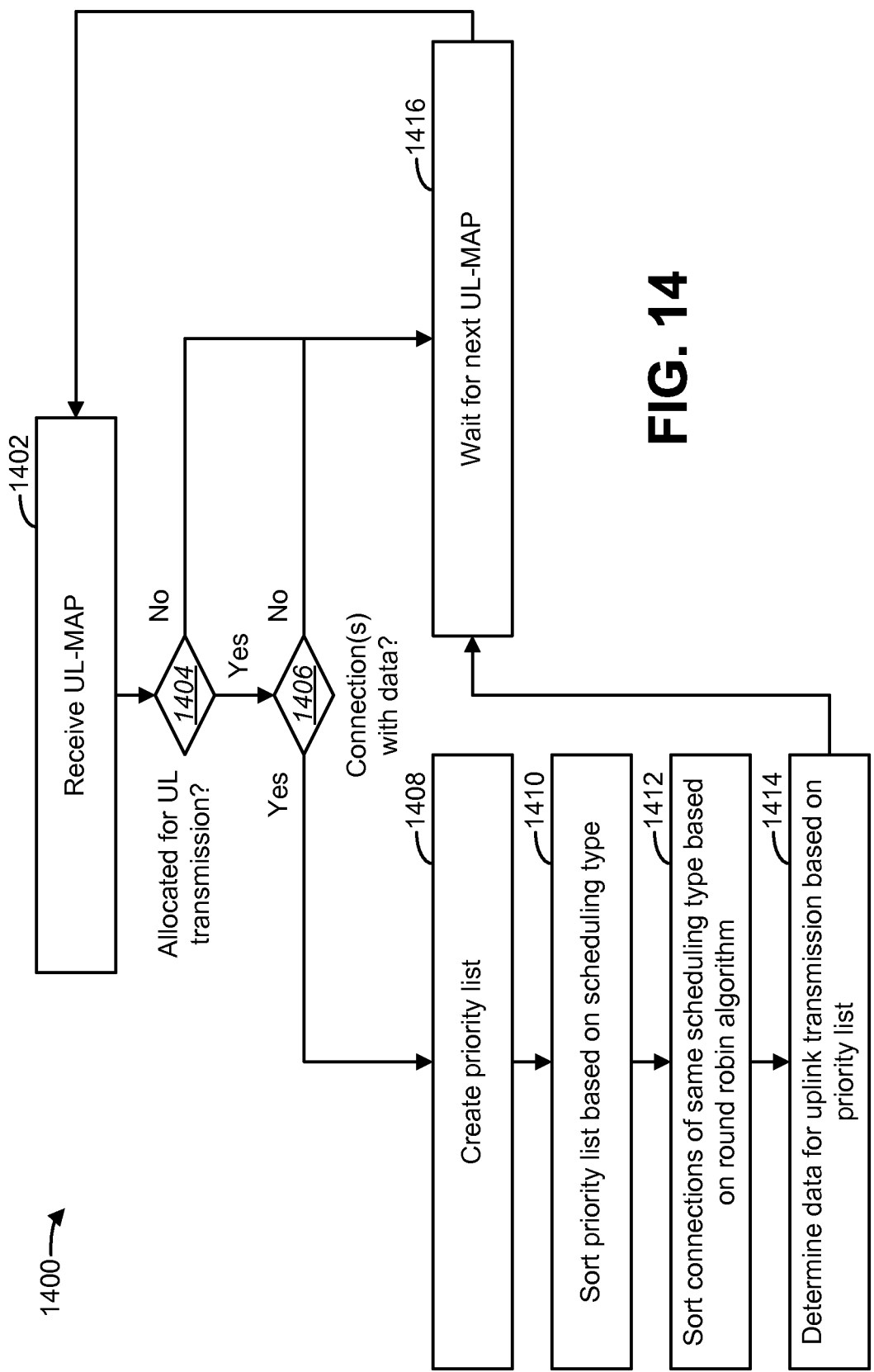
FIG. 14 illustrates another example of a method for scheduling uplink connections.

FIG. 14 illustrates another example of a method 1400 for scheduling uplink connections 412. The method 1400 may be implemented by a scheduler 420 at a subscriber station 406.

The method 1400 may include receiving 1402 a UL-MAP message 336. The UL-MAP message 336 may indicate whether any uplink bandwidth has been allocated to the subscriber station 406 for the next uplink sub-frame 318. If it is determined 1404 that uplink bandwidth has been allocated to the subscriber station 406, and if it is determined 1406 that there is at least one active uplink connection 412 with data 418 to transmit, then the method 1400 may include creating 1408 a priority list 820.

The method 1400 may also include sorting 1410 the connections 412 in the priority list 820 based on the scheduling type 512. In other words, connections 412 of higher priority 514 scheduling types 512 may have precedence over connections 412 of lower priority 514 scheduling types 512 in scheduling.

Under some circumstances, there may be multiple active connections 412 of the same scheduling type 512 with data 418 to transmit. In this situation, the connections 412 of the same scheduling type 512 may be sorted 1412 based on a round robin algorithm. The scheduler 420 may start the order from the next connection 412 in the round after the ending connection 412 of the last uplink bandwidth allocation. For example, suppose that there are three connections 412 of the same scheduling type 512: C1, C2, and C3. These connections 412 may be ordered C1, C2, and C3 for this uplink sub-frame 318. The next time that bandwidth is allocated to the subscriber station 406 for uplink transmission, these connections 412 may be ordered C2, C3, and C1 for that uplink sub-frame 318. The next time that bandwidth is allocated to the subscriber station 406 for uplink transmission, these connections 412 may be ordered C3, C1, and C2 for that uplink sub-frame 318, and so on.

The method 1400 may also include determining 1414 the data 418 for uplink transmission based on the priority list 820. Once the priority list 820 is decided, the scheduler 420 can decide the amount of data 418 (e.g., the number of data bytes) to allocate for the various connections 412 from the top to the bottom in the priority list 820. In other words, the scheduler 420 may determine the amount of data 418 to allocate for each connection 412 for uplink transmission one connection 412 after another in the priority list 820.

The scheduler 420 may allocate all of the data 418 from a particular connection 412 before allocating the data 418 from the next connection 412 in the priority list 820. The allocation of data 418 may continue in this manner until all available data 418 is used up.

Once the available data 418 to transmit has been allocated and/or once the available bandwidth has been utilized, the method 1400 may then include waiting 1416 for the next UL-MAP message 336. When the next UL-MAP message 336 is received 1402, the method 1400 may then proceed as described above.

Thus, FIG. 14 illustrates another example of a method 1400 where intra-user QoS requirements 614 are taken into consideration in scheduling uplink transmissions. More specifically, where there are multiple connections 412 with data 418 available to transmit, the scheduler 420 may select the connections 412 whose data 418 will be transmitted on the uplink 110 based on the priority 514 of the corresponding scheduling type 512. Where there are multiple active connections 412 of the same scheduling type 512 with data 418 to transmit, the connections 412 of the same scheduling type 512 may be sorted 1412 based on a round robin algorithm. The algorithm depicted in FIG. 14 can consider scheduling types 512 in bandwidth allocation to support differentiated service types.

Figure 14A:
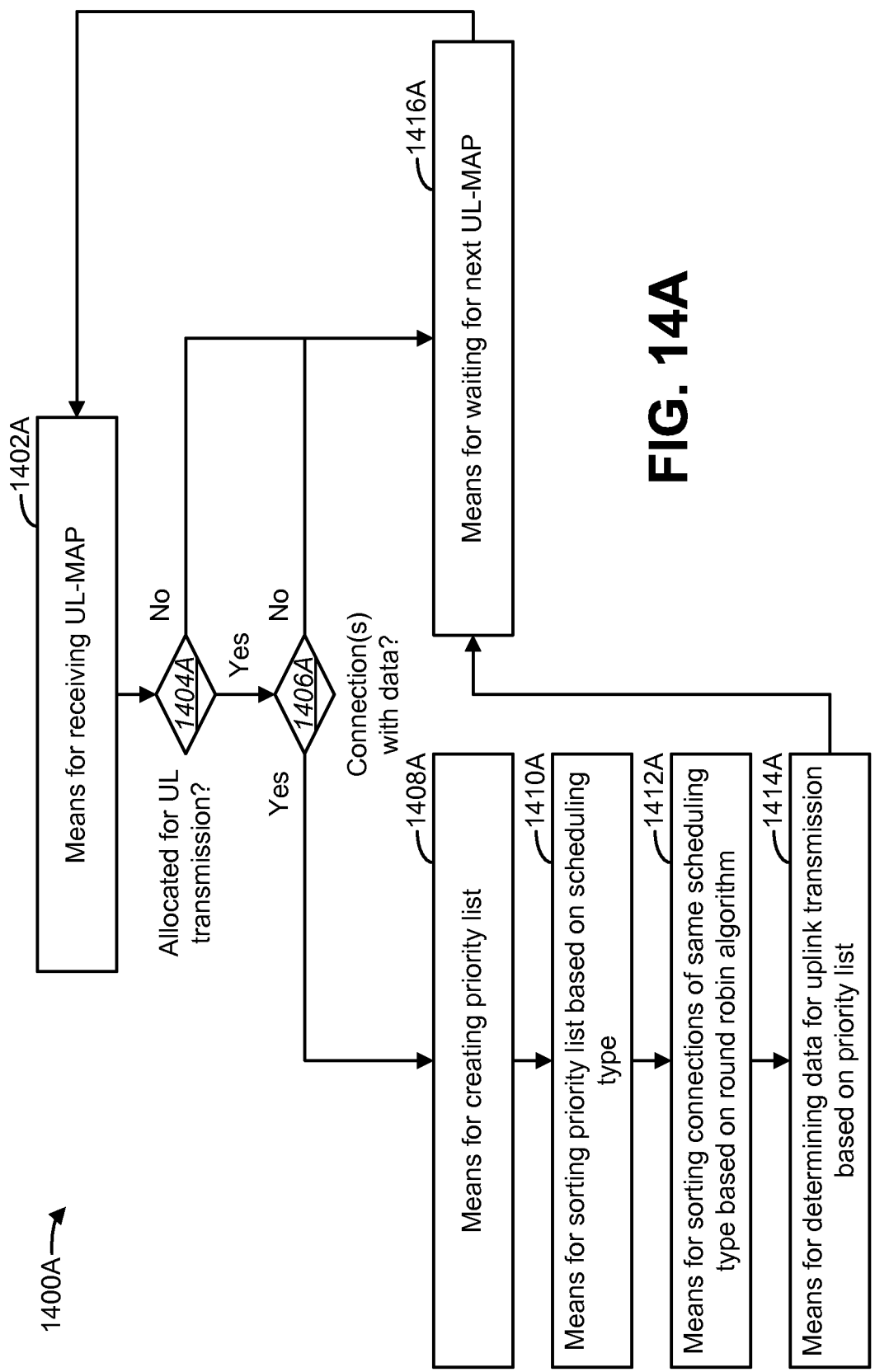
FIG. 14A illustrates means-plus-function blocks corresponding to the method of FIG. 14.

The method 1400 of FIG. 14 described above may be performed by various hardware and/or software component(s) and/or module(s) corresponding to the means-plus-function blocks 1400A illustrated in FIG. 14A. In other words, blocks 1402 through 1416 illustrated in FIG. 14 correspond to means-plus-function blocks 1402A through 1416A illustrated in FIG. 14A.

Figure 15:
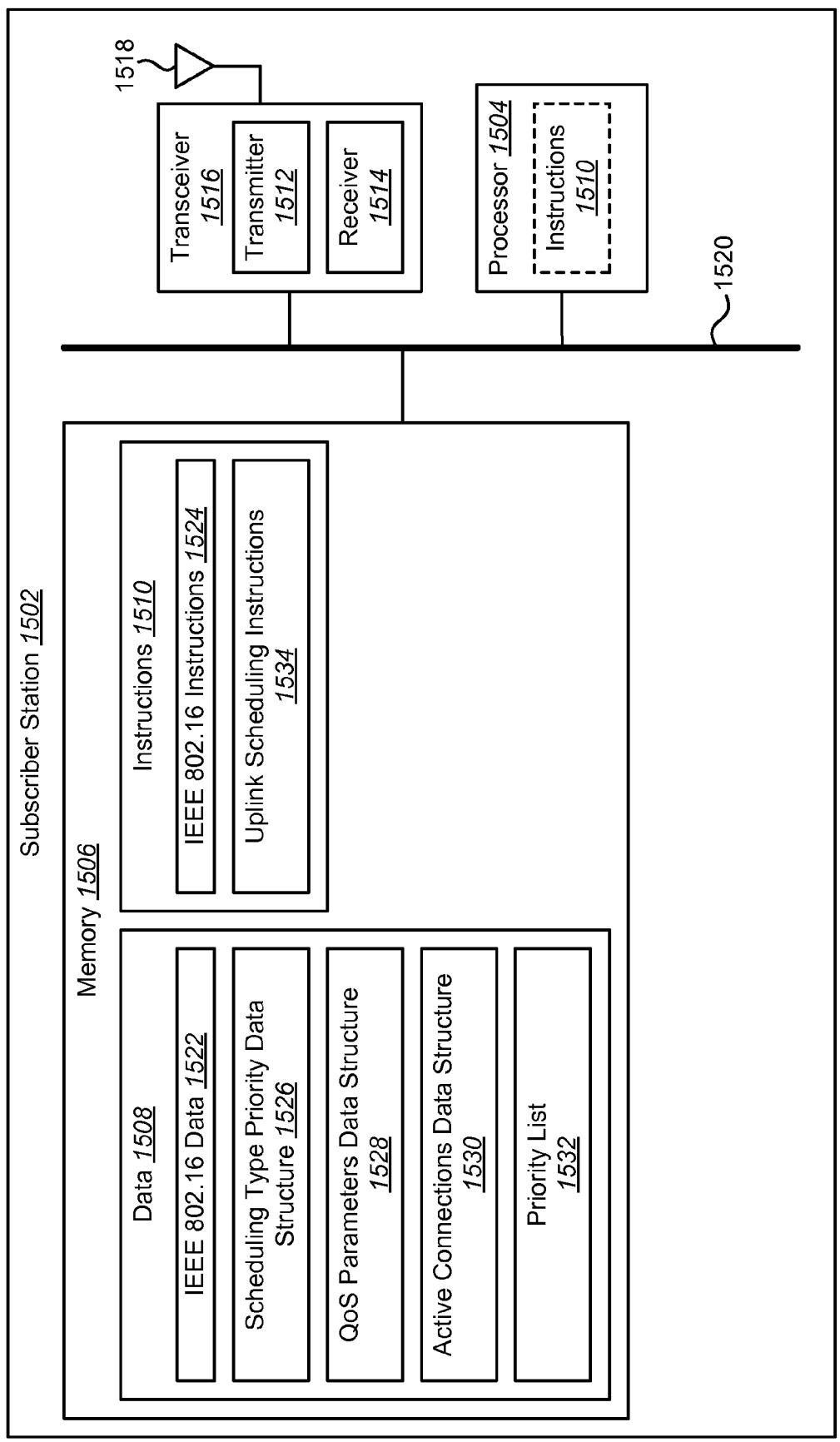
FIG. 15 illustrates an example of a subscriber station that is configured to implement an uplink scheduling scheme as described herein.

FIG. 15 illustrates an example of a subscriber station 1502 that is configured to implement an uplink scheduling scheme as described herein. The subscriber station 1502 includes a processor 1504. The processor 1504 may be a general purpose single- or multi-chip microprocessor (e.g., an ARM), a special purpose microprocessor (e.g., a digital signal processor (DSP)), a microcontroller, a programmable gate array, etc. The processor 1504 may be referred to as a central processing unit (CPU). Although just a single processor 1504 is shown in the subscriber station 1502 of FIG. 15, in an alternative configuration, a combination of processors 1504 (e.g., an ARM and DSP) could be used.

The subscriber station 1502 also includes memory 1506. The memory 1506 may be any electronic component capable of storing electronic information. The memory 1506 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1508 and instructions 1510 may be stored in the memory 1506. The instructions 1510 may be executable by the processor 1504 to implement some or all of the methods described herein. Executing the instructions 1510 may involve the use of the data 1508 that is stored in the memory 1506.

The subscriber station 1502 may also include a transmitter 1512 and a receiver 1514 to allow transmission and reception of data between the subscriber station 1502 and a remote location, such as a base station 104. The transmitter 1512 and receiver 1514 may be collectively referred to as a transceiver 1516. An antenna 1518 may be electrically coupled to the transceiver 1516. The subscriber station 1502 may also include (not shown) multiple transmitters 1512, multiple receivers 1514, multiple transceivers 1516 and/or multiple antenna 1518.

The various components of the subscriber station 1502 may be coupled together by one or more buses, which may include a power bus, a control signal bus, a status signal bus, a data bus, etc. For the sake of clarity, the various buses are illustrated in FIG. 15 as a bus system 1520.

The subscriber station 1502 may be configured to communicate via a wireless communication network that supports the IEEE 802.16 standard (i.e., WiMAX). The data 1508 stored in the memory 1506 may include data 1522 that facilitates communication in accordance with the IEEE 802.16 standard. Similarly, the instructions 1510 stored in the memory 1506 may include instructions 1524 that facilitate communication in accordance with the IEEE 802.16 standard.

The data 1508 in the memory 1506 may include one or more data structures 1526 that prioritize different scheduling types 512. An example of this type of data structure 1526 is shown in FIG. 5, and was discussed above in connection therewith.

The data 1508 in the memory 1506 may also include one or more data structures 1528 that associate quality of service (QoS) parameters 614 with different scheduling types 612. An example of this type of data structure 1528 is shown in FIG. 6, and was discussed above in connection therewith.

The data 1508 in the memory 1506 may also include one or more data structures 1530 that store certain information for each of the active connections 712 that are maintained by the subscriber station 1502. An example of this type of data structure 1530 is shown in FIG. 7, and was discussed above in connection therewith.

The data 1508 in the memory 1506 may also include a priority list 1532. An example of a priority list 1532 is shown in FIG. 8, and was discussed above in connection therewith.

The instructions 1510 in the memory 1506 may include instructions 1534 for scheduling uplink connections 412. The uplink scheduling instructions 1534 may be configured so that when they are executed by the processor 1504, they implement the uplink scheduling method 900 that is shown in FIG. 9. Alternatively, the uplink scheduling instructions 1534 may be configured so that when they are executed by the processor 1504, they implement the uplink scheduling method 1400 that is shown in FIG. 14.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions or as one or more sets of instructions on a computer-readable medium or storage medium. A computer-readable medium may be any available medium that can be accessed by a computer or one or more processing devices. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 9 and 14, can be downloaded and/or otherwise obtained by a subscriber station and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a subscriber station and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for intra-user quality of service (QoS) uplink scheduling, the method being implemented by a subscriber station, the method comprising:
   receiving, at the subscriber station, an uplink bandwidth allocation from a base station;
   determining scheduling types associated with active uplink connections that are maintained with the base station by the subscriber station;
   determining QoS parameters corresponding to the different scheduling types;
   determining a scheduling metric for each of the active uplink connections based on the allocated bandwidth, wherein different equations involving QoS parameters are used to determine scheduling metrics for active uplink connections having different scheduling types;
   prioritizing multiple active uplink connections of the same scheduling type using the determined scheduling metrics; and
   scheduling the active uplink connections for uplink transmissions based on the different scheduling types and their corresponding scheduling metrics.

2. The method of claim 1, wherein scheduling the active uplink connections comprises giving connections of higher priority scheduling types precedence over connections of lower priority scheduling types.

3. The method of claim 2, wherein the scheduling types are prioritized as unsolicited grant service (UGS)>real-time polling service (rtPS) or extended real-time polling service (ertPS)>non-real-time polling service (nrtPS)>best effort (BE).

4. The method of claim 1, wherein the scheduling metric for an unsolicited grant service (UGS) scheduling type is calculated as:

$$Ui=f(Ri|Max\_Ri)+g(Di|Max\_Ti);$$

wherein $f(Ri|Max\_Ri)=b1(Ri/Max\_Ri)$ if $Ri>a*Max\_Ri$, and wherein otherwise $f=b1/a$;
wherein $g(Di|Max\_Ti)=b2/(1-Di/(c*Max\_Ti))$ if $Di<(c-d)*Max\_Ti$, and wherein otherwise $g=b2*c/d$; and
wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

5. The method of claim 1, wherein the scheduling metric for a real-time polling service (rtPS) scheduling type or an extended real-time polling service (ertPS) scheduling type is calculated as:

$$Ui=f1(Ri|Min\_Ri,Max\_Ri)+g(Di|Max\_Ti);$$

wherein $f1(Ri|Min\_Ri, Max\_Ri)=b3/(Ri/Min\_Ri)$ if $Ri>e*Min\_Ri$ and $Ri<Max\_Ri$, wherein $f1=b3/e$ if $Ri \le e*Min\_Ri$, and wherein $f1=0$ if $Ri \ge Max\_Ri$;
wherein $g(Di|Max\_Ti)=b2/(1-Di/(c*Max\_Ti))$ if $Di<(c-d)*Max\_Ti$, and wherein otherwise $g=b2*c/d$; and
wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

6. The method of claim 1, wherein the scheduling metric for a non-real-time polling service (nrtPS) scheduling type is calculated as:

$$Ui=f1(Ri|Min\_Ri,Max\_Ri);$$

wherein $f1(Ri|Min\_Ri, Max\_Ri)=b3/(Ri/Min\_Ri)$ if $Ri>e*Min\_Ri$ and $Ri<Max\_Ri$, wherein $f1=b3/e$ if $Ri \le e*Min\_Ri$, and wherein $f1=0$ if $Ri \ge Max\_Ri$; and
wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

7. The method of claim 1, wherein the scheduling metric for a best effort (BE) scheduling type is calculated as:

$$Ui=f2(Ri|Max\_Ri);$$

wherein $f2(Ri|Max\_Ri)=1$ if $Ri<Max\_Ri$, and wherein otherwise $f2=0$; and
wherein Ri is an allocated traffic rate for connection i, and wherein Max_Ri is the maximum sustained traffic rate for connection i.

8. The method of claim 1, wherein the subscriber station is configured to communicate via a wireless communication network that supports an Institute of Electronic and Electrical Engineers (IEEE) 802.16 standard.

9. The method of claim 1, wherein prioritizing multiple active uplink connections of the same scheduling type further comprises selecting a highest scheduling metric based on the determining of the scheduling metric for each of the active uplink connections.

10. A subscriber station that is configured for intra-user quality of service (QoS) uplink scheduling, comprising:
   a processor;
   memory in electronic communication with the processor; and
   instructions stored in the memory, the instructions being executable by the processor to:
   receive, at the subscriber station, an uplink bandwidth allocation from a base station;
   determine scheduling types associated with active uplink connections that are maintained with the base station by the subscriber station;

determine QoS parameters corresponding to the different scheduling types;

determine a scheduling metric for each of the active uplink connections based on the allocated bandwidth, wherein different equations involving QoS parameters are used to determine scheduling metrics for active uplink connections having different scheduling types;

prioritize multiple active uplink connections of the same scheduling type using the determined scheduling metrics; and schedule the active uplink connections for uplink transmissions based on the different scheduling types and their corresponding scheduling metrics.

11. The subscriber station of claim 10, wherein scheduling the active uplink connections comprises giving connections of higher priority scheduling types precedence over connections of lower priority scheduling types.

12. The subscriber station of claim 11, wherein the scheduling types are prioritized as unsolicited grant service (UGS)>real-time polling service (rtPS) or extended real-time polling service (ertPS)>non-real-time polling service (nrtPS)>best effort (BE).

13. The subscriber station of claim 10, wherein the scheduling metric for an unsolicited grant service (UGS) scheduling type is calculated as:

$$Ui=f(Ri|Max\_Ri)+g(Di|Max\_Ti);$$

wherein $f(Ri|Max\_Ri)=b1/(Ri/Max\_Ri)$ if $Ri>a*Max\_Ri$, and wherein otherwise $f=b1/a$;

wherein $g(Di|Max\_Ti)=b2/(1-Di/(c*Max\_Ti))$ if $Di<(c-d)*Max\_Ti$, and wherein otherwise $g=b2*c/d$; and wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

14. The subscriber station of claim 10, wherein the scheduling metric for a real-time polling service (rtPS) scheduling type or an extended real-time polling service (ertPS) scheduling type is calculated as $$Ui=f1(Ri|Min\_Ri,Max\_Ri)+g(Di|Max\_Ti);$$

wherein $f1(Ri|Min\_Ri, Max\_Ri)=b3/(Ri/Min\_Ri)$ if $Ri>e*Min\_Ri$ and $Ri<Max\_Ri$, wherein $f1=b3/e$ if $Ri\le e*Min\_Ri$, and wherein $f1=0$ if $Ri\ge Max\_Ri$;

wherein $g(Di|Max\_Ti)=b2/(1-Di/(c*Max\_Ti))$ if $Di<(c-d)*Max\_Ti$, and wherein otherwise $g=b2*c/d$; and wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

15. The subscriber station of claim 10, wherein the scheduling metric for a non-real-time polling service (nrtPS) scheduling type is calculated as:

$$Ui=f1(Ri|Min\_Ri,Max\_Ri);$$

wherein $f1(Ri|Min\_Ri, Max\_Ri)=b3/(Ri/Min\_Ri)$ if $Ri>e*Min\_Ri$ and $Ri<Max\_Ri$, wherein $f1=b3/e$ if $Ri\le e*Min\_Ri$, and wherein $f1=0$ if $Ri\ge Max\_Ri$; and wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

16. The subscriber station of claim 10, wherein the scheduling metric for a best effort (BE) scheduling type is calculated as:

$$Ui=f2(Ri|Max\_Ri);$$

wherein $f2(Ri|Max\_Ri)=1$ if $Ri<Max\_Ri$, and wherein otherwise $f2=0$; and wherein Ri is an allocated traffic rate for connection i, and wherein Max_Ri is the maximum sustained traffic rate for connection i.

17. The subscriber station of claim 10, wherein the instructions being executable by the processor to prioritize multiple active uplink connections of the same scheduling type further comprise instructions to select a highest scheduling metric based on the determining of the scheduling metric for each of the active uplink connections.

18. The subscriber station of claim 10, wherein the subscriber station is configured to communicate via a wireless communication network that supports an Institute of Electronic and Electrical Engineers (IEEE) 802.16 standard.

19. A subscriber station that is configured for intra-user quality of service (QoS) uplink scheduling, comprising:

means for receiving, at the subscriber station, an uplink bandwidth allocation from a base station;

means for determining scheduling types associated with active uplink connections that are maintained with the base station by the subscriber station;

means for determining QoS parameters corresponding to the different scheduling types;

means for determining a scheduling metric for each of the active uplink connections based on the allocated bandwidth, wherein different equations involving QoS parameters are used to determine scheduling metrics for active uplink connections having different scheduling types;

means for prioritizing multiple active uplink connections of the same scheduling type using the determined scheduling metrics; and means for scheduling the active uplink connections for uplink transmissions based on the different scheduling types and their corresponding scheduling metrics.

20. The subscriber station of claim 19, wherein scheduling the active uplink connections comprises giving connections of higher priority scheduling types precedence over connections of lower priority scheduling types.

21. The subscriber station of claim 20, wherein the scheduling types are prioritized as unsolicited grant service (UGS)>real-time polling service (rtPS) or extended real-time polling service (ertPS)>non-real-time polling service (nrtPS)>best effort (BE).

22. The subscriber station of claim 19, wherein the scheduling metric for an unsolicited grant service (UGS) scheduling type is calculated as:

$$Ui=f(Ri|Max\_Ri)+g(Di|Max\_Ti);$$

wherein $f(Ri|Max\_Ri)=b1/(Ri/Max\_Ri)$ if $Ri>a*Max\_Ri$, and wherein otherwise $f=b1/a$;

wherein $g(Di|Max\_Ti)=b2/(1-Di/(c*Max\_Ti))$ if $Di<(c-d)*Max\_Ti$, and wherein otherwise $g=b2*c/d$; and wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

23. The subscriber station of claim 19, wherein the scheduling metric for a real-time polling service (rtPS) scheduling type or an extended real-time polling service (ertPS) scheduling type is calculated as $$Ui=f1(Ri|Min\_Ri,Max\_Ri)+g(Di|Max\_Ti);$$

wherein f1(Ri|Min_Ri, Max_Ri)=b3/(Ri/Min_Ri) if Ri>e*Min_Ri and Ri<Max_Ri, wherein f1=b3/e if Ri≤e*Min_Ri, and wherein f1=0 if Ri≥Max_Ri;

wherein g(Di|Max_Ti)=b2/(1−Di/(c*Max_Ti)) if Di<(c−d)*Max_Ti, and wherein otherwise g=b2*c/d; and wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

24. The subscriber station of claim 19, wherein the scheduling metric for a non-real-time polling service (nrtPS) scheduling type is calculated as:

$$Ui=f1(Ri|Min\_Ri,Max\_Ri);$$

wherein f1(Ri|Min_Ri, Max_Ri)=b3/(Ri/Min_Ri) if Ri>e*Min_Ri and Ri<Max_Ri, wherein f1=b3/e if Ri≤e*Min_Ri, and wherein f1=0 if Ri≥Max_Ri; and wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

25. The subscriber station of claim 19, wherein the scheduling metric for a best effort (BE) scheduling type is calculated as:

$$Ui=f2(Ri|Max\_Ri);$$

wherein f2(Ri|Max_Ri)=1 if Ri<Max_Ri, and wherein otherwise f2=0; and wherein Ri is an allocated traffic rate for connection i, and wherein Max_Ri is the maximum sustained traffic rate for connection i.

26. The subscriber station of claim 19, wherein the subscriber station is configured to communicate via a wireless communication network that supports an Institute of Electronic and Electrical Engineers (IEEE) 802.16 standard.

27. The subscriber station of claim 19, wherein the means for prioritizing multiple active uplink connections of the same scheduling type further comprises means for selecting a highest scheduling metric based on the determining of the scheduling metric for each of the active uplink connections.

28. A computer-program product for facilitating intra-user quality of service (QoS) uplink scheduling, the computer-program product comprising a non-transitory computer-readable medium having instructions thereon, the instructions being executable using one or more processing devices and the instructions comprising:

instructions for receiving, at the subscriber station, an uplink bandwidth allocation from a base station;

instructions for determining scheduling types associated with active uplink connections that are maintained with the base station by the subscriber station;

instructions for determining QoS parameters corresponding to the different scheduling types;

instructions for determining a scheduling metric for each of the active uplink connections based on the allocated bandwidth, wherein different equations involving QoS parameters are used to determine scheduling metrics for active uplink connections having different scheduling types;

instructions for prioritizing multiple active uplink connections of the same scheduling type using the determined scheduling metrics; and instructions for scheduling the active uplink connections for uplink transmissions based on the different scheduling types and their corresponding scheduling metrics.

29. The computer-program product of claim 28, wherein scheduling the active uplink connections comprises giving connections of higher priority scheduling types precedence over connections of lower priority scheduling types.

30. The computer-program product of claim 29, wherein the scheduling types are prioritized as unsolicited grant service (UGS)>real-time polling service (rtPS) or extended real-time polling service (ertPS)>non-real-time polling service (nrtPS)>best effort (BE).

31. The computer-program product of claim 28, wherein the scheduling metric for an unsolicited grant service (UGS) scheduling type is calculated as:

$$Ui=f(Ri|Max\_Ri)+g(Di|Max\_Ti);$$

wherein f(Ri|Max_Ri)=b1/(Ri/Max_Ri) if Ri>a*Max_Ri, and wherein otherwise f=b1/a;

wherein g(Di|Max_Ti)=b2/(1−Di/(c*Max_Ti)) if Di<(c−d)*Max_Ti, and wherein otherwise g=b2*c/d; and wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

32. The computer-program product of claim 28, wherein the scheduling metric for a real-time polling service (rtPS) scheduling type or an extended real-time polling service (ertPS) scheduling type is calculated as $$Ui=f1(Ri|Min\_Ri,Max\_Ri)+g(Di|Max\_Ti);$$

wherein f1(Ri|Min_Ri, Max_Ri)=b3/(Ri/Min_Ri, Max_Ri) if Ri>e*Min_Ri and Ri<Max_Ri, wherein f1=b3/e if Ri≤e*Min_Ri, and wherein f1=0 if Ri≥Max_Ri;

wherein g(Di|Max_Ti)=b2/(1−Di/(c*Max_Ti)) if Di<(c−d)*Max_Ti, and wherein otherwise g=b2*c/d; and wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

33. The computer-program product of claim 28, wherein the scheduling metric for a non-real-time polling service (nrtPS) scheduling type is calculated as:

$$Ui = f1(Ri|Min\_Ri, Max\_Ri);$$

wherein $f1(Ri|Min\_Ri, Max\_Ri) = b3/(Ri/Min\_Ri)$ if $Ri > e*Min\_Ri$ and $Ri < Max\_Ri$, wherein $f1 = b3/e$ if $Ri \leq e*Min\_Ri$, and wherein $f1 = 0$ if $Ri \geq Max\_Ri$; and wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

34. The computer-program product of claim 28, wherein the scheduling metric for a best effort (BE) scheduling type is calculated as:

$$Ui = f2(Ri|Max\_Ri);$$

wherein $f2(Ri|Max\_Ri) = 1$ if $Ri < Max\_Ri$, and wherein otherwise $f2 = 0$; and wherein Ri is an allocated traffic rate for connection i, and wherein Max_Ri is the maximum sustained traffic rate for connection i.

35. The computer-program product of claim 28, wherein the computer-program product is included in a subscriber station, and wherein the subscriber station is configured to communicate via a wireless communication network that supports an Institute of Electronic and Electrical Engineers (IEEE) 802.16 standard.

36. The computer-program product of claim 28, wherein the instructions for prioritizing multiple active uplink connections of the same scheduling type further comprise instructions for selecting a highest scheduling metric based on the determining of the scheduling metric for each of the active uplink connections.

37. A method for intra-user quality of service (QoS) uplink scheduling, the method being implemented by a subscriber station, the method comprising:
   determining scheduling types associated with active uplink connections that are maintained by the subscriber station;
   determining QoS parameters corresponding to the different scheduling types;
   determining a scheduling metric for each of the active uplink connections, wherein different equations involving QoS parameters are used to determine scheduling metrics for active uplink connections having different scheduling types; and
   scheduling the active uplink connections for uplink transmissions based on the different scheduling types and their corresponding scheduling metrics,
   wherein the scheduling metric for an unsolicited grant service (UGS) scheduling type is calculated as:

$$Ui = f(Ri|Max\_Ri) + g(Di|Max\_Ti);$$

wherein $f(Ri|Max\_Ri) = b1/(Ri/Max\_Ri)$ if $Ri > a*Max\_Ri$, and wherein otherwise $f = b1/a$;
   wherein $g(Di|Max\_Ti) = b2/(1 - Di/(c*Max\_Ti))$ if $Di < (c-d)*Max\_Ti$, and wherein otherwise $g = b2*c/d$; and
   wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

38. A method for intra-user quality of service (QoS) uplink scheduling, the method being implemented by a subscriber station, the method comprising:
   determining scheduling types associated with active uplink connections that are maintained by the subscriber station;
   determining QoS parameters corresponding to the different scheduling types;
   determining a scheduling metric for each of the active uplink connections, wherein different equations involving QoS parameters are used to determine scheduling metrics for active uplink connections having different scheduling types; and
   scheduling the active uplink connections for uplink transmissions based on the different scheduling types and their corresponding scheduling metrics,
   wherein the scheduling metric for a real-time polling service (rtPS) scheduling type or an extended real-time polling service (ertPS) scheduling type is calculated as:

$$Ui = f1(Ri|Min\_Ri, Max\_Ri) + g(Di|Max\_Ti);$$

wherein $f1(Ri|Min\_Ri, Max\_Ri) = b3/(Ri/Min\_Ri)$ if $Ri > e*Min\_Ri$ and $Ri < Max\_Ri$, wherein $f1 = b3/e$ if $Ri \leq e*Min\_Ri$, and wherein $f1 = 0$ if $Ri \geq Max\_Ri$;
   wherein $g(Di|Max\_Ti) = b2/(1 - Di/(c*Max\_Ti))$ if $Di < (c-d)*Max\_Ti$, and wherein otherwise $g = b2*c/d$; and
   wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

39. A method for intra-user quality of service (QoS) uplink scheduling, the method being implemented by a subscriber station, the method comprising:
   determining scheduling types associated with active uplink connections that are maintained by the subscriber station;
   determining QoS parameters corresponding to the different scheduling types;
   determining a scheduling metric for each of the active uplink connections, wherein different equations involving QoS parameters are used to determine scheduling metrics for active uplink connections having different scheduling types; and
   scheduling the active uplink connections for uplink transmissions based on the different scheduling types and their corresponding scheduling metrics,
   wherein the scheduling metric for a non-real-time polling service (nrtPS) scheduling type is calculated as:

$$Ui = f1(Ri|Min\_Ri, Max\_Ri);$$

wherein $f1(Ri|Min\_Ri, Max\_Ri) = b3/(Ri/Min\_Ri)$ if $Ri > e*Min\_Ri$ and $Ri < Max\_Ri$, wherein $f1 = b3/e$ if $Ri \leq e*Min\_Ri$, and wherein $f1 = 0$ if $Ri \geq Max\_Ri$; and
   wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

40. A subscriber station that is configured for intra-user quality of service (QoS) uplink scheduling, comprising:
a processor;
memory in electronic communication with the processor; and
instructions stored in the memory, the instructions being executable by the processor to:
   determine scheduling types associated with active uplink connections that are maintained by the subscriber station;
   determine QoS parameters corresponding to the different scheduling types;
   determine a scheduling metric for each of the active uplink connections, wherein different equations involving QoS parameters are used to determine scheduling metrics for active uplink connections having different scheduling types; and
   schedule the active uplink connections for uplink transmissions based on the different scheduling types and their corresponding scheduling metrics,
wherein the scheduling metric for an unsolicited grant service (UGS) scheduling type is calculated as:

$Ui=f(Ri|Max\_Ri)+g(Di|Max\_Ti)$;

wherein $f(Ri|Max\_Ri)=b1/(Ri/Max\_Ri)$ if $Ri>a*Max\_Ri$, and wherein otherwise $f=b1/a$;
wherein $g(Di|Max\_Ti)=b2/(1-Di/(c*Max\_Ti))$ if $Di<(c-d)*Max\_Ti$, and wherein otherwise $g=b2*c/d$; and
wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

41. A subscriber station that is configured for intra-user quality of service (QoS) uplink scheduling, comprising:
a processor;
memory in electronic communication with the processor; and
instructions stored in the memory, the instructions being executable by the processor to:
   determine scheduling types associated with active uplink connections that are maintained by the subscriber station;
   determine QoS parameters corresponding to the different scheduling types;
   determine a scheduling metric for each of the active uplink connections, wherein different equations involving QoS parameters are used to determine scheduling metrics for active uplink connections having different scheduling types; and
   schedule the active uplink connections for uplink transmissions based on the different scheduling types and their corresponding scheduling metrics,
wherein the scheduling metric for a real-time polling service (rtPS) scheduling type or an extended real-time polling service (ertPS) scheduling type is calculated as:

$Ui=f1(Ri|Min\_Ri,Max\_Ri)+g(Di|Max\_Ti)$;

wherein $f1(Ri|Min\_Ri, Max\_Ri)=b3/(Ri/Min\_Ri)$ if $Ri>e*Min\_Ri$ and $Ri<Max\_Ri$, wherein $f1=b3/e$ if $Ri \le e*Min\_Ri$, and wherein $f1=0$ if $Ri \ge Max\_Ri$;
wherein $g(Di|Max\_Ti)=b2/(1-Di/(c*Max\_Ti))$ if $Di<(c-d)*Max\_Ti$, and wherein otherwise $g=b2*c/d$; and
wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

42. A subscriber station that is configured for intra-user quality of service (QoS) uplink scheduling, comprising:
a processor;
memory in electronic communication with the processor; and
instructions stored in the memory, the instructions being executable by the processor to:
   determine scheduling types associated with active uplink connections that are maintained by the subscriber station;
   determine QoS parameters corresponding to the different scheduling types;
   determine a scheduling metric for each of the active uplink connections, wherein different equations involving QoS parameters are used to determine scheduling metrics for active uplink connections having different scheduling types; and
   schedule the active uplink connections for uplink transmissions based on the different scheduling types and their corresponding scheduling metrics,
wherein the scheduling metric for a non-real-time polling service (nrtPS) scheduling type is calculated as:

$Ui=f1(Ri|Min\_Ri,Max\_Ri)$;

wherein $f1(Ri|Min\_Ri, Max\_Ri)=b3/(Ri/Min\_Ri)$ if $Ri>e*Min\_Ri$ and $Ri<Max\_Ri$, wherein $f1=b3/e$ if $Ri \le e*Min\_Ri$, and wherein $f1=0$ if $Ri \ge Max\_Ri$; and
wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

43. A subscriber station that is configured for intra-user quality of service (QoS) uplink scheduling, comprising:
means for determining scheduling types associated with active uplink connections that are maintained by the subscriber station;
means for determining QoS parameters corresponding to the different scheduling types;
means for determining a scheduling metric for each of the active uplink connections, wherein different equations involving QoS parameters are used to determine scheduling metrics for active uplink connections having different scheduling types; and
means for scheduling the active uplink connections for uplink transmissions based on the different scheduling types and their corresponding scheduling metrics,
wherein the scheduling metric for an unsolicited grant service (UGS) scheduling type is calculated as:

$Ui=f(Ri|Max\_Ri)+g(Di|Max\_Ti)$;

wherein $f(Ri|Max\_Ri)=b1/(Ri/Max\_Ri)$ if $Ri>a*Max\_Ri$, and wherein otherwise $f=b1/a$;
wherein $g(Di|Max\_Ti)=b2/(1-Di/(c*Max\_Ti))$ if $Di<(c-d)*Max\_Ti$, and wherein otherwise $g=b2*c/d$; and wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

44. A subscriber station that is configured for intra-user quality of service (QoS) uplink scheduling, comprising:
    means for determining scheduling types associated with active uplink connections that are maintained by the subscriber station;
    means for determining QoS parameters corresponding to the different scheduling types;
    means for determining a scheduling metric for each of the active uplink connections, wherein different equations involving QoS parameters are used to determine scheduling metrics for active uplink connections having different scheduling types; and
    means for scheduling the active uplink connections for uplink transmissions based on the different scheduling types and their corresponding scheduling metrics,
    wherein the scheduling metric for a real-time polling service (rtPS) scheduling type or an extended real-time polling service (ertPS) scheduling type is calculated as:

$$Ui = f1(Ri|Min\_Ri, Max\_Ri) + g(Di|Max\_Ti);$$

wherein $f1(Ri|Min\_Ri, Max\_Ri) = b3/(Ri/Min\_Ri)$ if $Ri > e*Min\_Ri$ and $Ri < Max\_Ri$, wherein $f1 = b3/e$ if $Ri \leq e*Min\_Ri$, and wherein $f1 = 0$ if $Ri \geq Max\_Ri$;
    wherein $g(Di|Max\_Ti) = b2/(1 - Di/(c*Max\_Ti))$ if $Di < (c-d)*Max\_Ti$, and wherein otherwise $g = b2*c/d$; and
    wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

45. A subscriber station that is configured for intra-user quality of service (QoS) uplink scheduling, comprising:
    means for determining scheduling types associated with active uplink connections that are maintained by the subscriber station;
    means for determining QoS parameters corresponding to the different scheduling types;
    means for determining a scheduling metric for each of the active uplink connections, wherein different equations involving QoS parameters are used to determine scheduling metrics for active uplink connections having different scheduling types; and
    means for scheduling the active uplink connections for uplink transmissions based on the different scheduling types and their corresponding scheduling metrics,
    wherein the scheduling metric for a non-real-time polling service (nrtPS) scheduling type is calculated as:

$$Ui = f1(Ri|Min\_Ri, Max\_Ri);$$

wherein $f1(Ri|Min\_Ri, Max\_Ri) = b3/(Ri/Min\_Ri)$ if $Ri > e*Min\_Ri$ and $Ri < Max\_Ri$, wherein $f1 = b3/e$ if $Ri \leq e*Min\_Ri$, and wherein $f1 = 0$ if $Ri \geq Max\_Ri$; and
    wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

46. A computer-program product for facilitating intra-user quality of service (QoS) uplink scheduling, the computer-program product comprising a non-transitory computer-readable medium having instructions thereon, the instructions being executable using one or more processing devices and the instructions comprising:
    instructions for determining scheduling types associated with active uplink connections that are maintained by the subscriber station;
    instructions for determining QoS parameters corresponding to the different scheduling types;
    instructions for determining a scheduling metric for each of the active uplink connections, wherein different equations involving QoS parameters are used to determine scheduling metrics for active uplink connections having different scheduling types; and
    instructions for scheduling the active uplink connections for uplink transmissions based on the different scheduling types and their corresponding scheduling metrics,
    wherein the scheduling metric for an unsolicited grant service (UGS) scheduling type is calculated as:

$$Ui = f(Ri|Max\_Ri) + g(Di|Max\_Ti);$$

wherein $f(Ri|Max\_Ri) = b1/(Ri/Max\_Ri)$ if $Ri > a*Max\_Ri$, and wherein otherwise $f = b1/a$;
    wherein $g(Di|Max\_Ti) = b2/(1 - Di/(c*Max\_Ti))$ if $Di < (c-d)*Max\_Ti$, and wherein otherwise $g = b2*c/d$; and
    wherein Di is a queuing delay of head of line data for connection i, wherein Ri is an allocated traffic rate for connection i, wherein Max_Ri is the maximum sustained traffic rate for connection i, wherein Max_Ti is the maximum latency for connection i, wherein b1 and b2 are weights between f and g, wherein a is a constant, wherein c is a percentage of latency allocated for a delay between the subscriber station and the base station, and wherein d<c.

47. A computer-program product for facilitating intra-user quality of service (QoS) uplink scheduling, the computer-program product comprising a non-transitory computer-readable medium having instructions thereon, the instructions being executable using one or more processing devices and the instructions comprising:
    instructions for determining scheduling types associated with active uplink connections that are maintained by the subscriber station;
    instructions for determining QoS parameters corresponding to the different scheduling types;
    instructions for determining a scheduling metric for each of the active uplink connections, wherein different equations involving QoS parameters are used to determine scheduling metrics for active uplink connections having different scheduling types; and
    instructions for scheduling the active uplink connections for uplink transmissions based on the different scheduling types and their corresponding scheduling metrics,
    wherein the scheduling metric for a real-time polling service (rtPS) scheduling type or an extended real-time polling service (ertPS) scheduling type is calculated as:

$$Ui = f1(Ri|Min\_Ri, Max\_Ri) + g(Di|Max\_Ti);$$

wherein f1(Ri|Min_Ri, Max_Ri)=b3/(Ri/Min_Ri, Max_Ri) if Ri>e*Min_Ri and Ri<Max_Ri, wherein f1=b3/e if Ri≤e*Min_Ri, and wherein f1=0 if Ri≥Max_Ri;

wherein g(Di|Max_Ti)=b2/(1−Di/(c*Max_Ti)) if Di<(c−d)*Max_Ti, and wherein otherwise g=b2*c/d; and wherein Di is a queuing delay of head of line data for connection i, wherein Ri is an allocated traffic rate for connection i, wherein Min_Ri is the minimum reserved traffic rate for connection i, wherein Max_Ti is the maximum latency for connection i, wherein Max_Ri is the maximum sustained traffic rate for connection i, wherein b3 and b2 are weights between f1 and g, wherein e is a constant, wherein c is a percentage of latency allocated for a delay between the subscriber station and the base station, and wherein d<c.

48. A computer-program product for facilitating intra-user quality of service (QoS) uplink scheduling, the computer-program product comprising a non-transitory computer-readable medium having instructions thereon, the instructions being executable using one or more processing devices and the instructions comprising:

instructions for determining scheduling types associated with active uplink connections that are maintained by the subscriber station;

instructions for determining QoS parameters corresponding to the different scheduling types;

instructions for determining a scheduling metric for each of the active uplink connections, wherein different equations involving QoS parameters are used to determine scheduling metrics for active uplink connections having different scheduling types; and instructions for scheduling the active uplink connections for uplink transmissions based on the different scheduling types and their corresponding scheduling metrics, wherein the scheduling metric for a non-real-time polling service (nrtPS) scheduling type is calculated as:

$$Ui = f1(Ri|Min\_Ri, Max\_Ri);$$

wherein f1(Ri|Min_Ri, Max_Ri)=b3/(Ri/Min_Ri) if Ri>e*Min_Ri and Ri<Max_Ri, wherein f1=b3/e if Ri≤e*Min_Ri, and wherein f1=0 if Ri≥Max_Ri; and wherein Ri is an allocated traffic rate for connection i, wherein Min_Ri is the minimum reserved traffic rate for connection i, wherein Max_Ri is the maximum sustained traffic rate for connection i, wherein b3 is a weighting factor, and wherein e is a constant.

* * * * *